(12) United States Patent
Han et al.

(10) Patent No.: US 12,395,689 B2
(45) Date of Patent: Aug. 19, 2025

(54) VIDEO PROCESSING METHOD AND ELECTRONIC DEVICE

(71) Applicant: Honor Device Co., Ltd., Shenzhen (CN)

(72) Inventors: Xiao Han, Shenzhen (CN); Jie Yi, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 64 days.

(21) Appl. No.: 18/570,379

(22) PCT Filed: May 24, 2022

(86) PCT No.: PCT/CN2022/094792
§ 371 (c)(1),
(2) Date: Dec. 14, 2023

(87) PCT Pub. No.: WO2022/262536
PCT Pub. Date: Dec. 22, 2022

(65) Prior Publication Data
US 2024/0223840 A1 Jul. 4, 2024

(30) Foreign Application Priority Data

| Jun. 16, 2021 | (CN) | 202110676709.3 |
| Nov. 29, 2021 | (CN) | 202111439314.8 |
| Jan. 13, 2022 | (CN) | 202210038856.2 |

(51) Int. Cl.
*H04N 21/431* (2011.01)
*G06F 3/0488* (2022.01)

(52) U.S. Cl.
CPC ....... *H04N 21/4312* (2013.01); *G06F 3/0488* (2013.01); *H04N 21/4318* (2013.01)

(58) Field of Classification Search
None
See application file for complete search history.

(56) References Cited

U.S. PATENT DOCUMENTS

2013/0239057 A1   9/2013   Ubillos et al.
2015/0113408 A1   4/2015   Eppolito
(Continued)

FOREIGN PATENT DOCUMENTS

CN   107896306 A   4/2018
CN   108769562 A   11/2018
(Continued)

*Primary Examiner* — Junior O Mendoza
(74) *Attorney, Agent, or Firm* — Slater Matsil, LLP

(57) ABSTRACT

Embodiments of this application provide a video processing method and an electronic device. The method includes: The electronic device displays a first interface. In response to a tap operation performed by a user on a first option on the first interface, the electronic device displays a second interface. In response to a first operation performed by the user on a first control on the second interface, the electronic device generates a first finished video. The electronic device displays a third interface. In response to a tap operation performed by the user on the first option on the third interface, the electronic device displays a fourth interface. In response to the first operation performed by the user on the first control on the fourth interface, the electronic device generates a second finished video. The first finished video and the second finished video have different video effects.

20 Claims, 43 Drawing Sheets

(56) References Cited

U.S. PATENT DOCUMENTS

| | | | |
|---|---|---|---|
| 2019/0132642 A1* | 5/2019 | Wang | H04N 21/8549 |
| 2019/0243531 A1* | 8/2019 | Chou | G06F 3/0482 |
| 2021/0264952 A1 | 8/2021 | Zhu et al. | |
| 2022/0392026 A1* | 12/2022 | Wang | H04N 21/2743 |
| 2024/0103711 A1* | 3/2024 | Han | H04N 23/60 |

FOREIGN PATENT DOCUMENTS

| | | |
|---|---|---|
| CN | 109040615 A | 12/2018 |
| CN | 110049266 A | 7/2019 |
| CN | 111209438 A | 5/2020 |
| CN | 111223166 A | 6/2020 |
| CN | 111541936 A | 8/2020 |
| CN | 111656347 A | 9/2020 |
| CN | 111835986 A | 10/2020 |
| CN | 111930994 A | 11/2020 |
| CN | 111954058 A | 11/2020 |
| CN | 112261416 A | 1/2021 |
| WO | 2020187086 A1 | 9/2020 |

\* cited by examiner

FIG. 3A(1)

FIG. 3A(2)

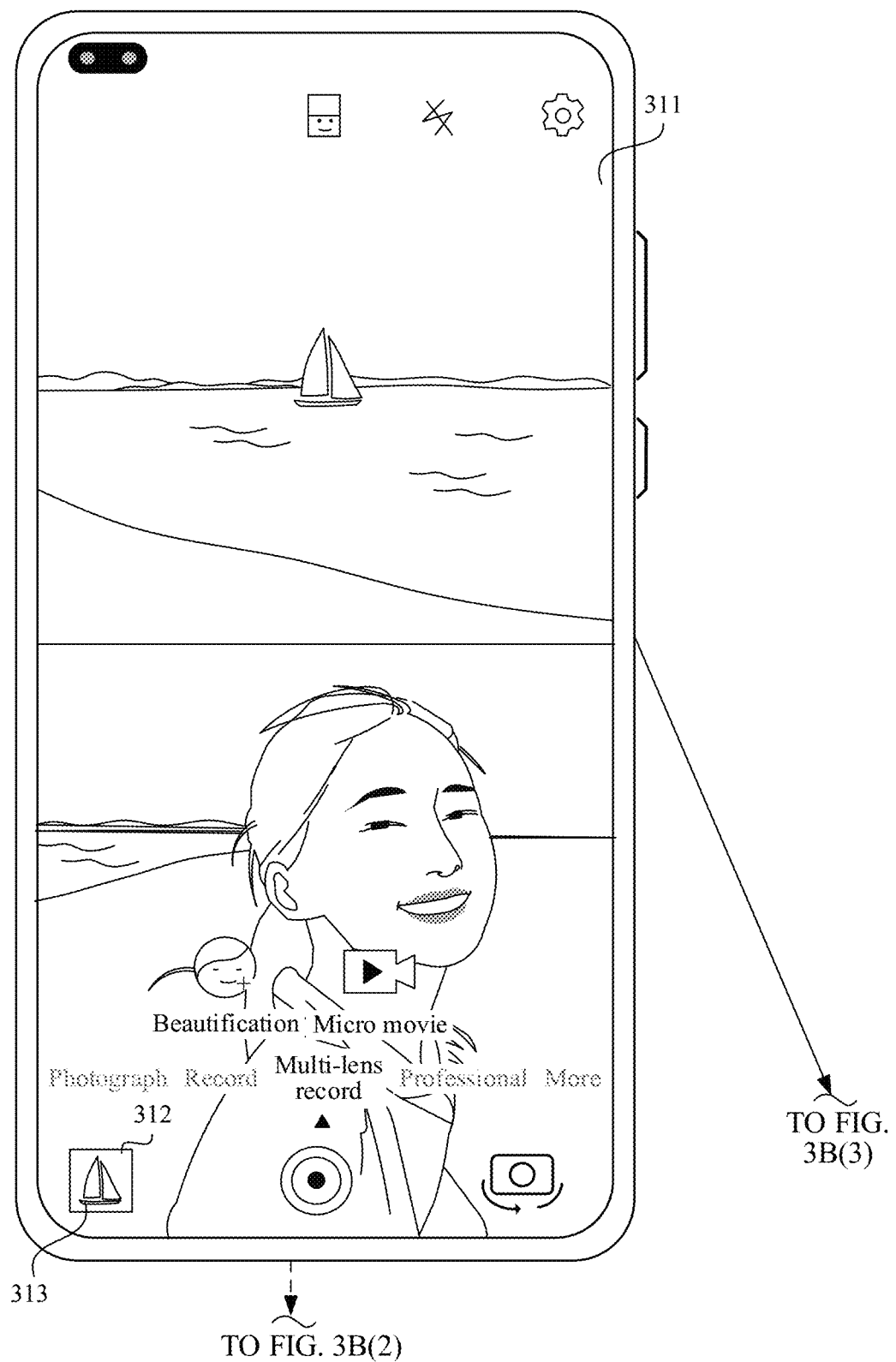
FIG. 3B(1)

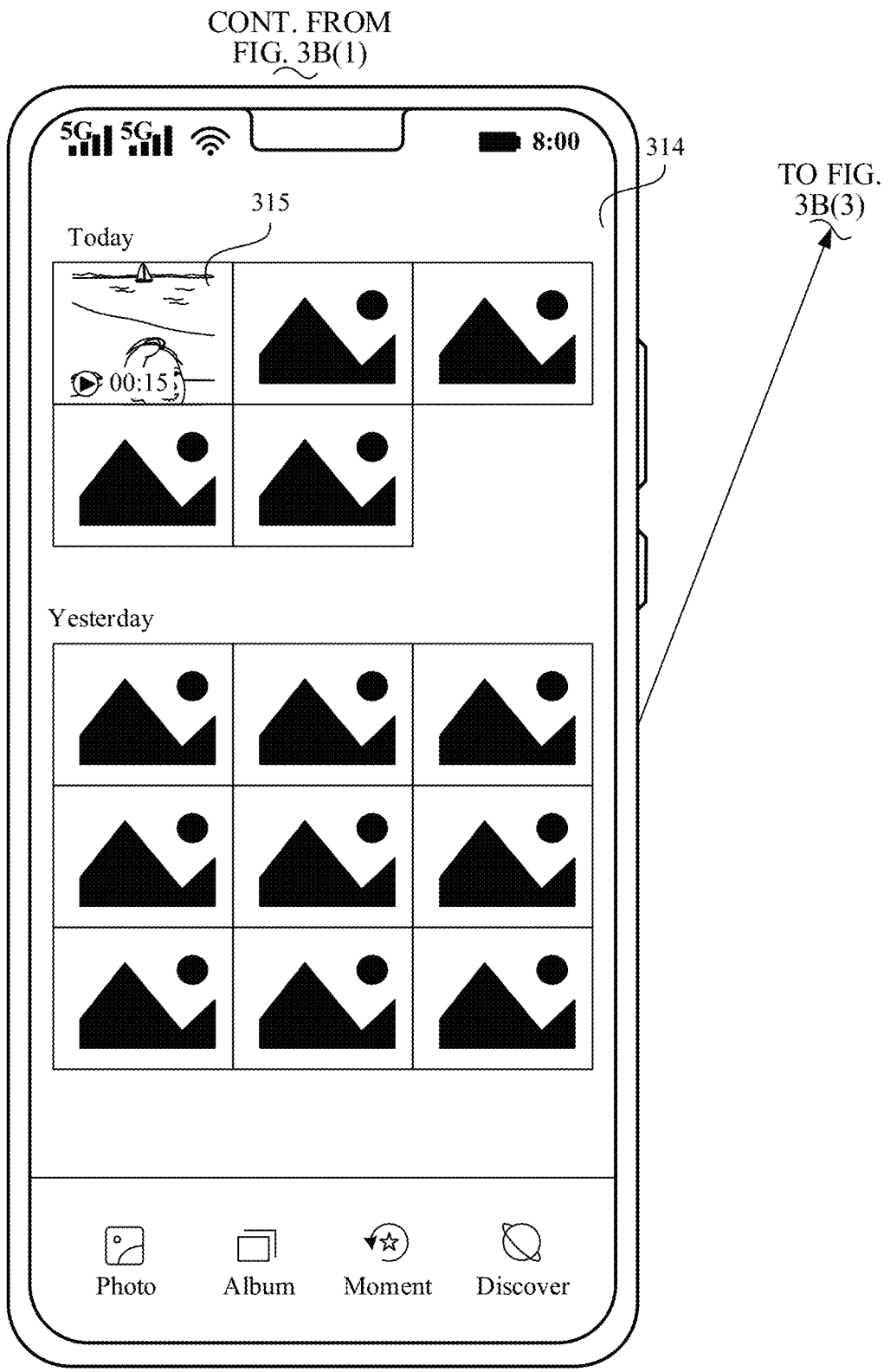
FIG. 3B(2)

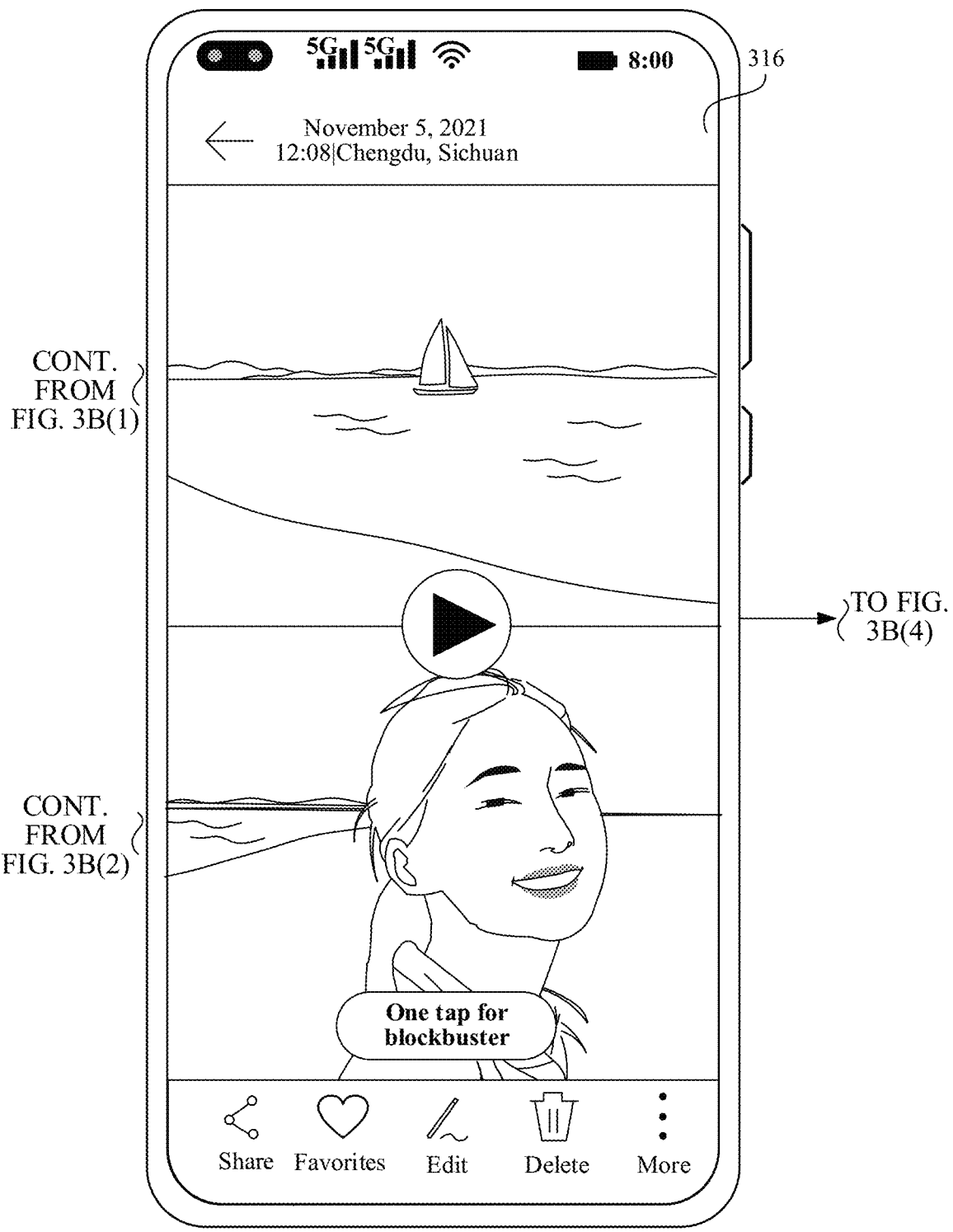
FIG. 3B(3)

FIG. 3B(4)

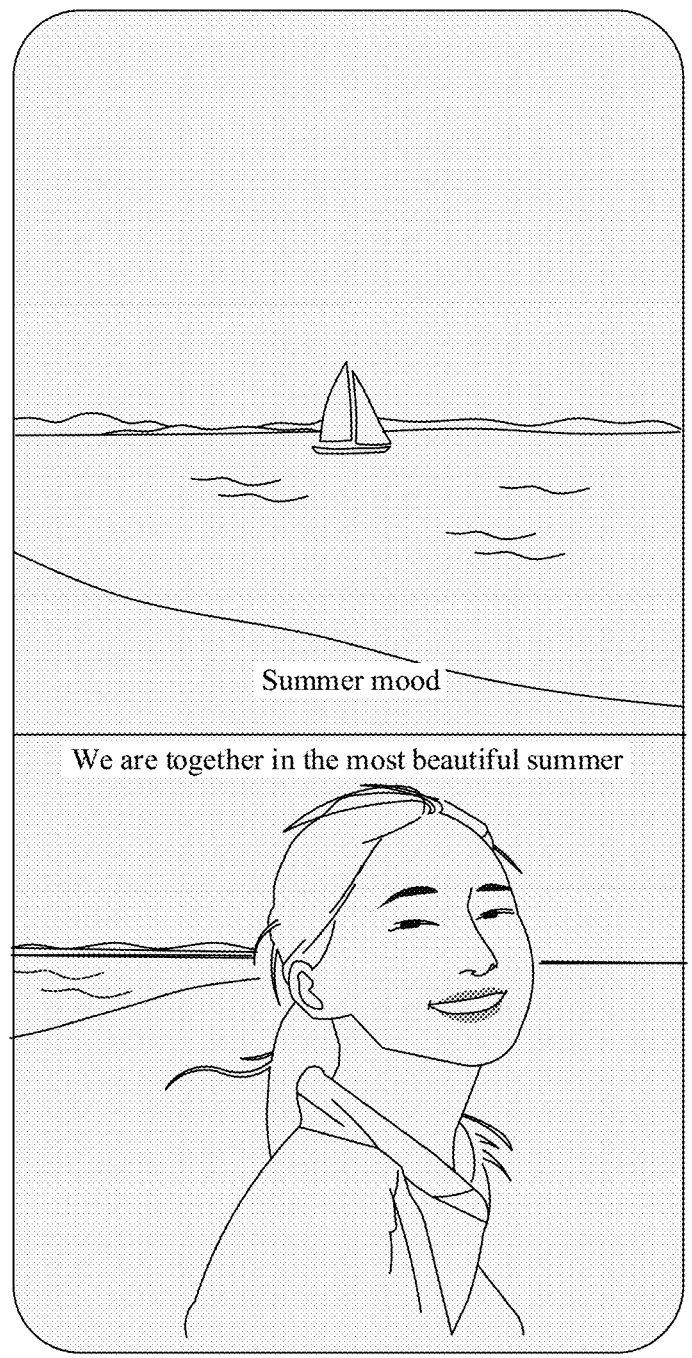
FIG. 5A(1)

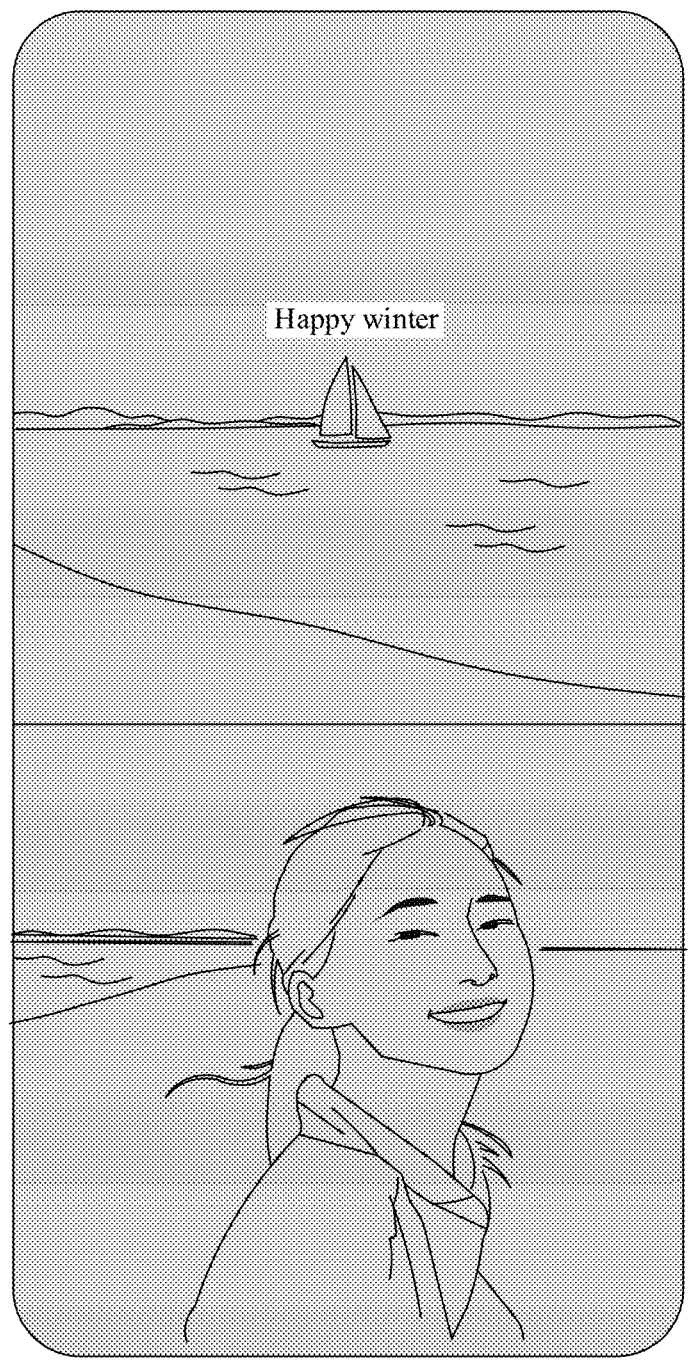
FIG. 5A(2)

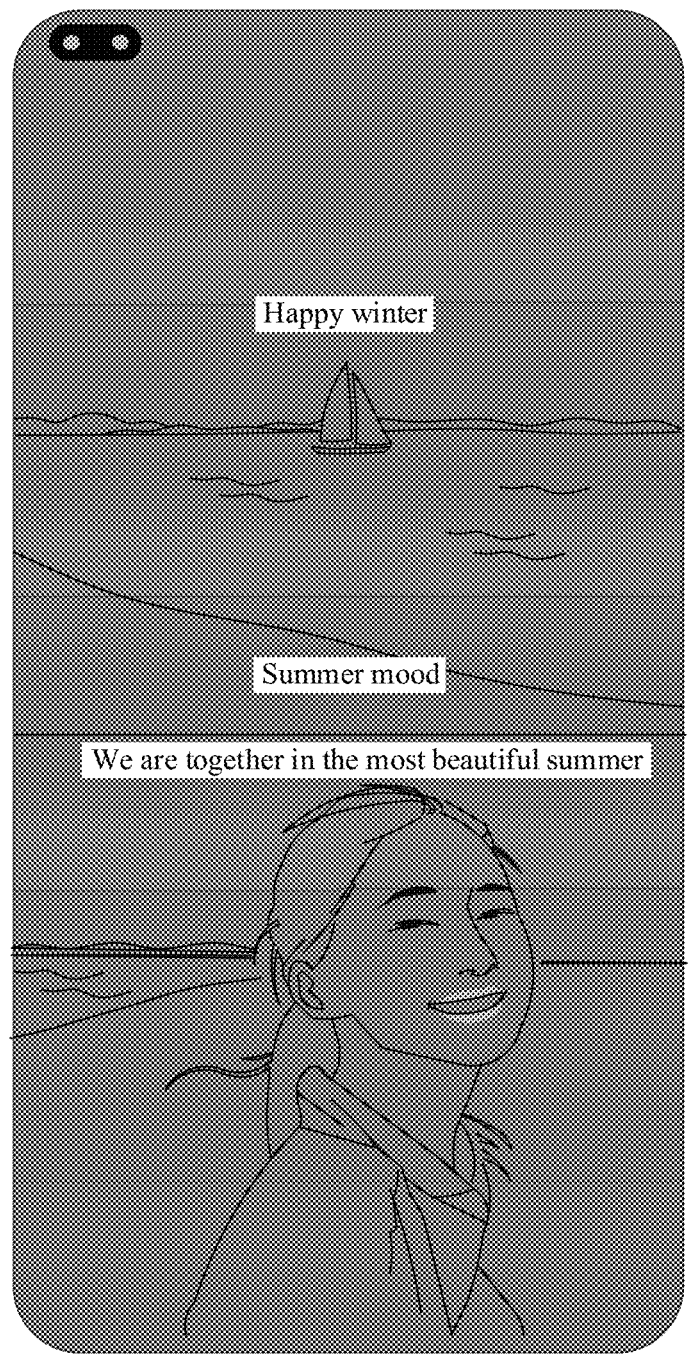
FIG. 5A(3)

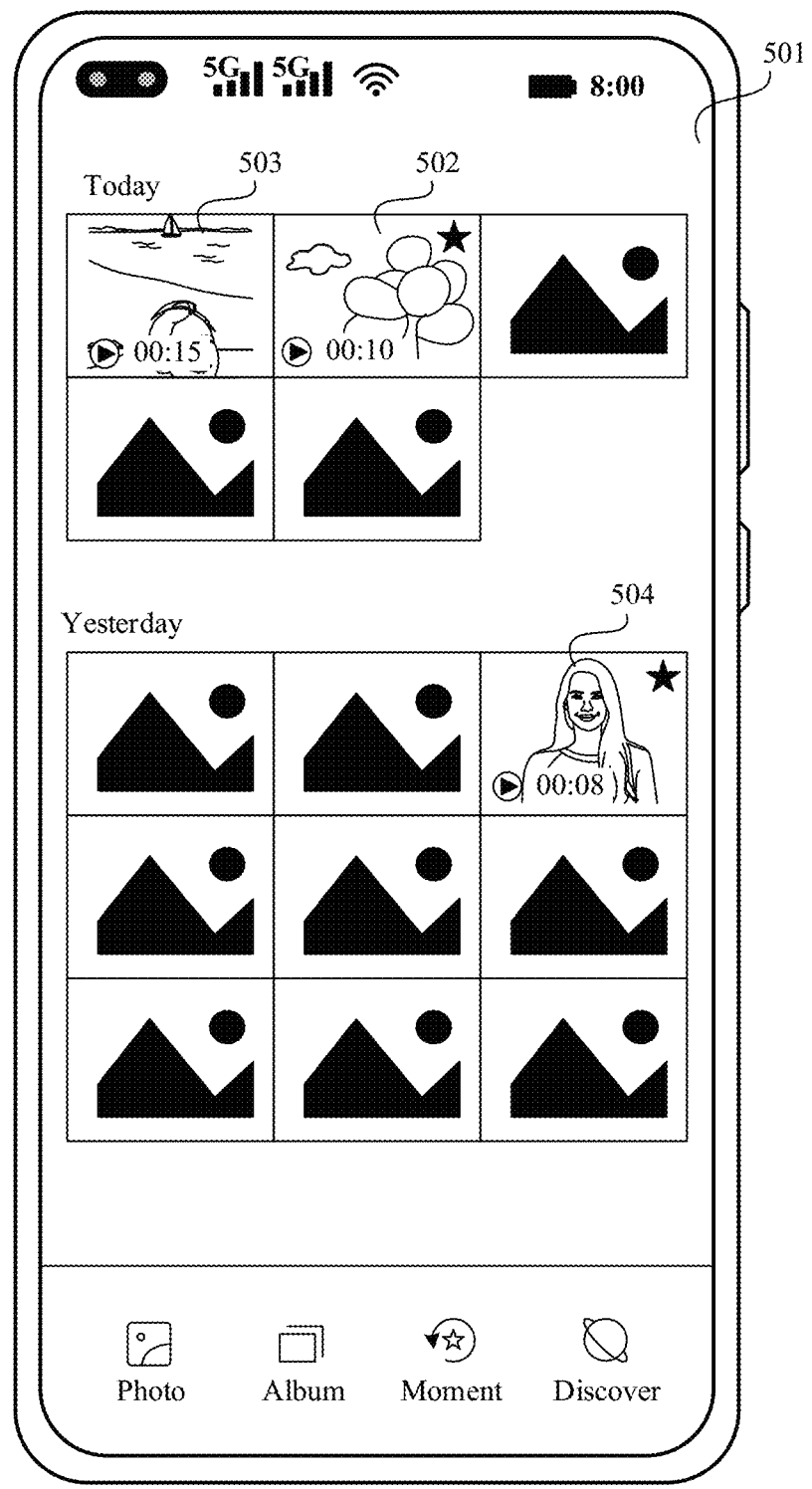
FIG. 5B(1)

FIG. 5B(2)

FIG. 5B(3)

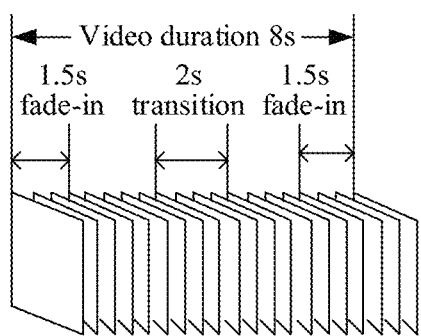
(a)
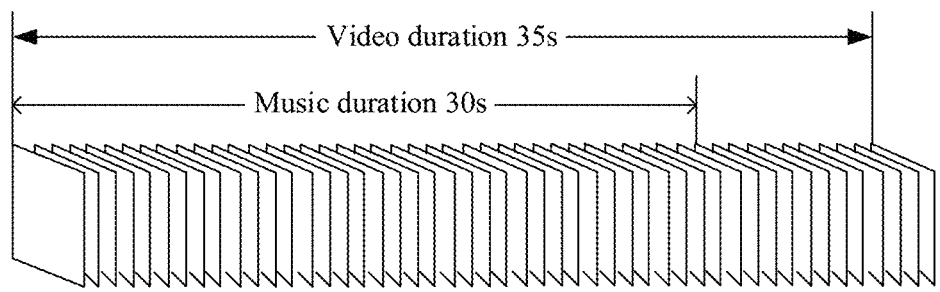
(b)
FIG. 6A

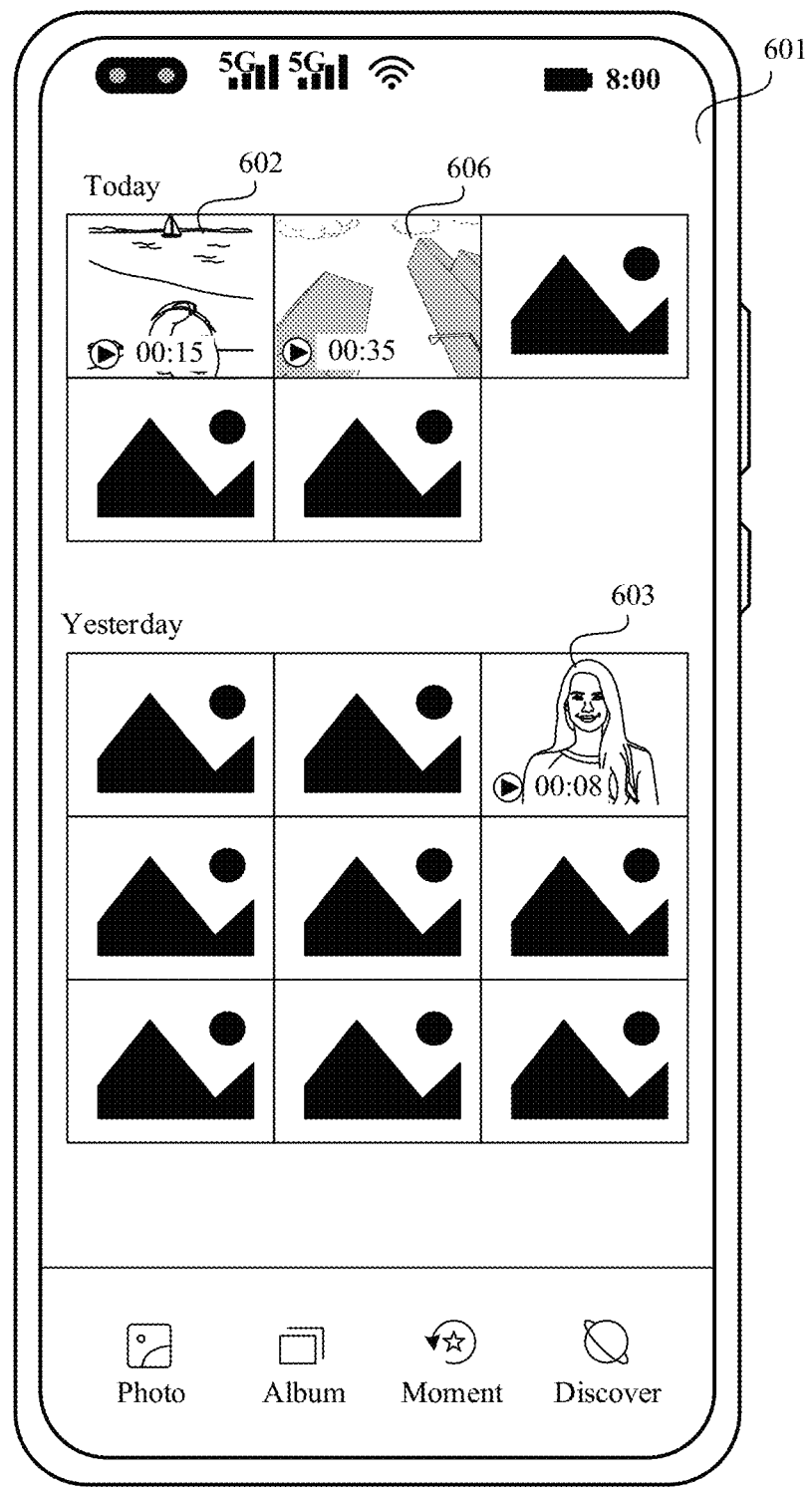
FIG. 6B(1)

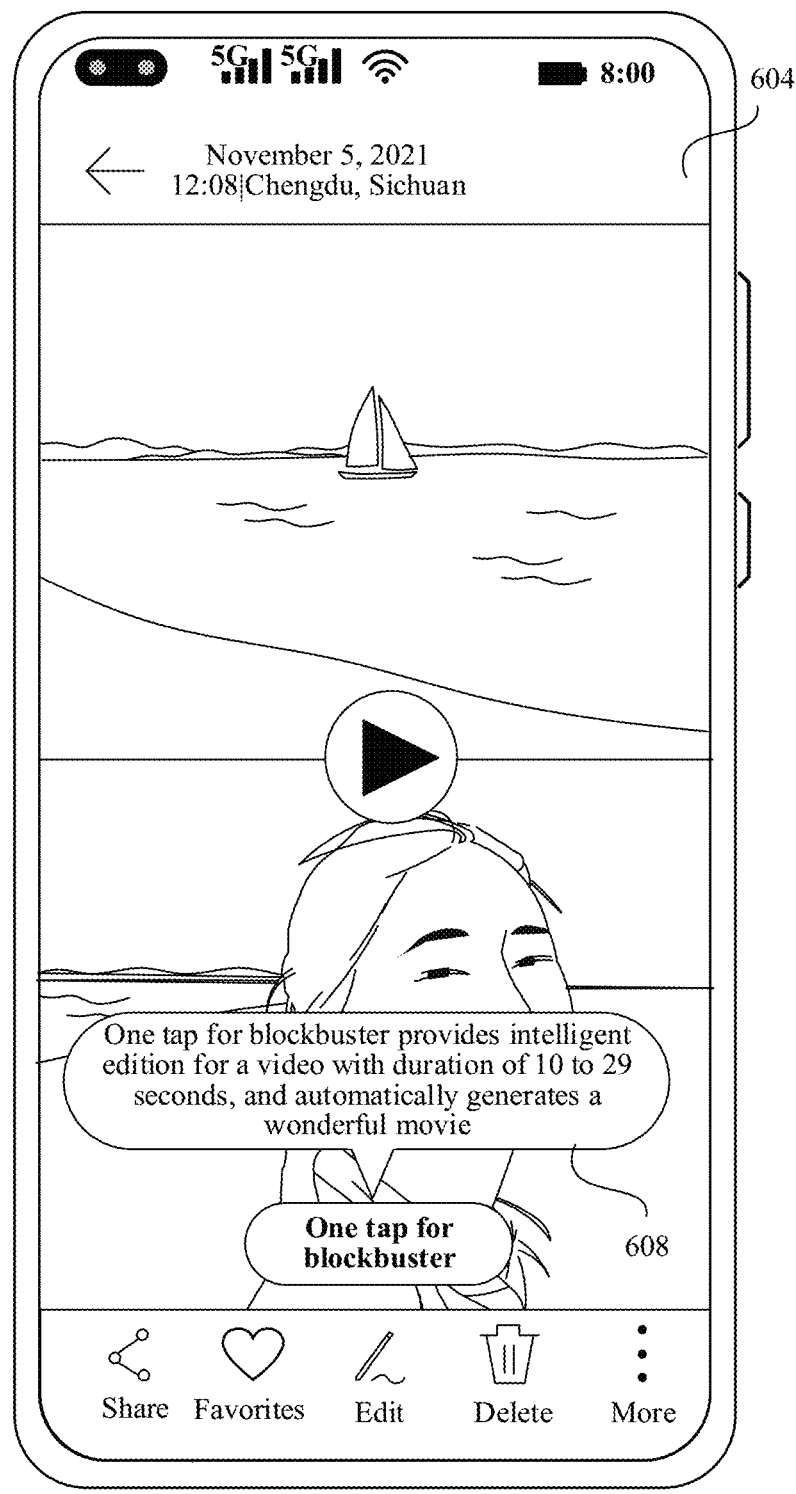
FIG. 6B(2)

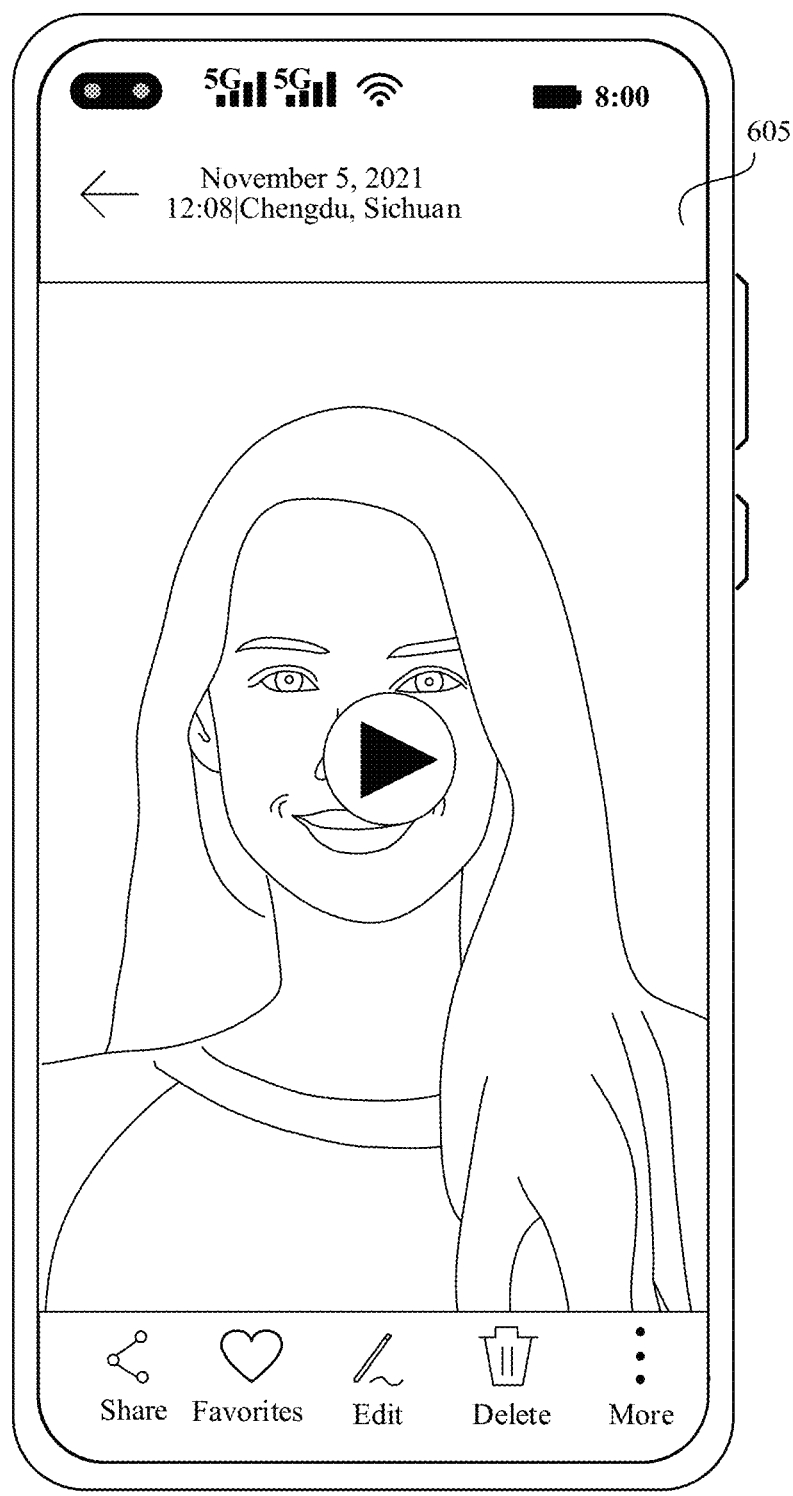
FIG. 6B(3)

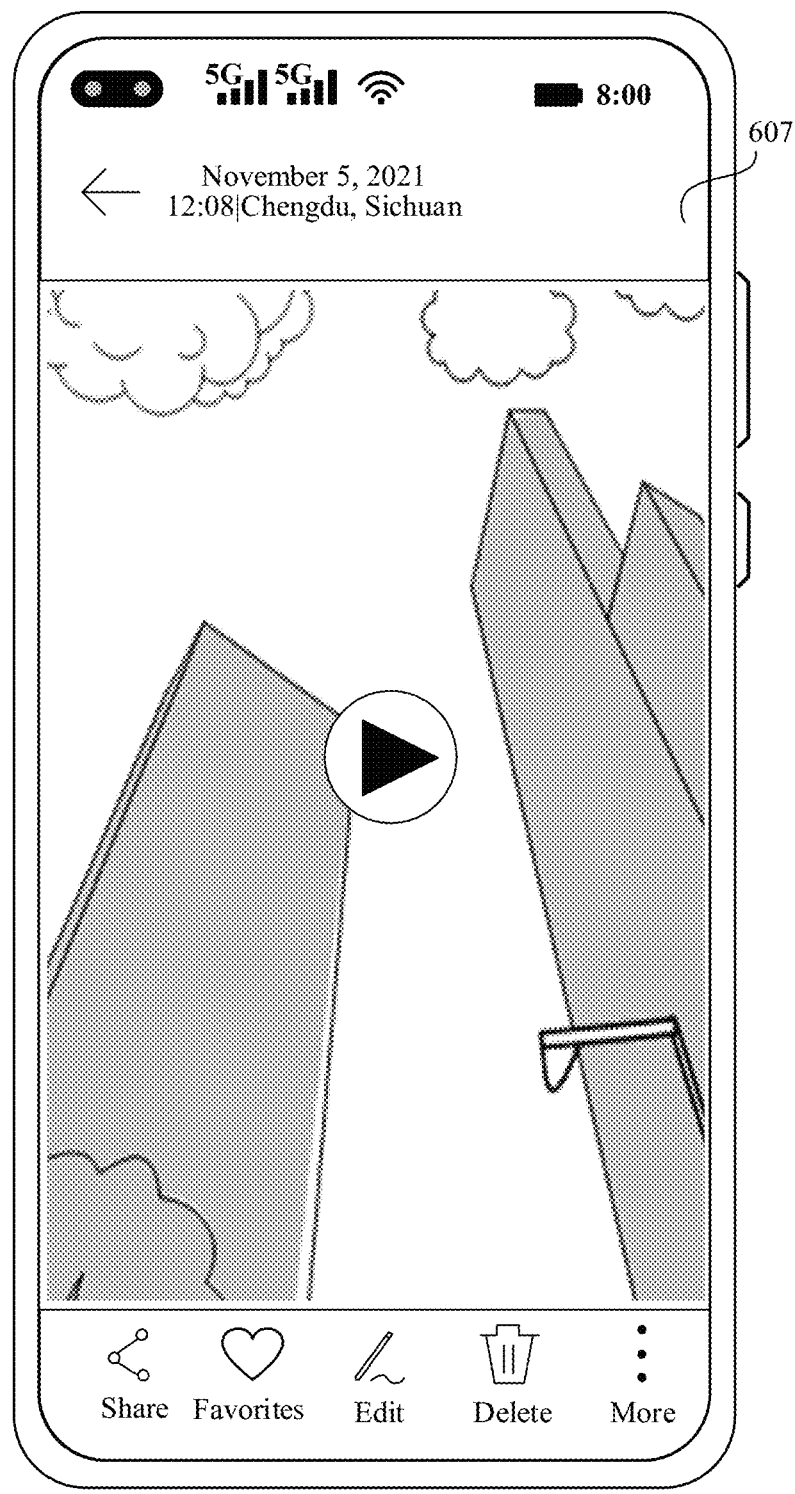
FIG. 6B(4)

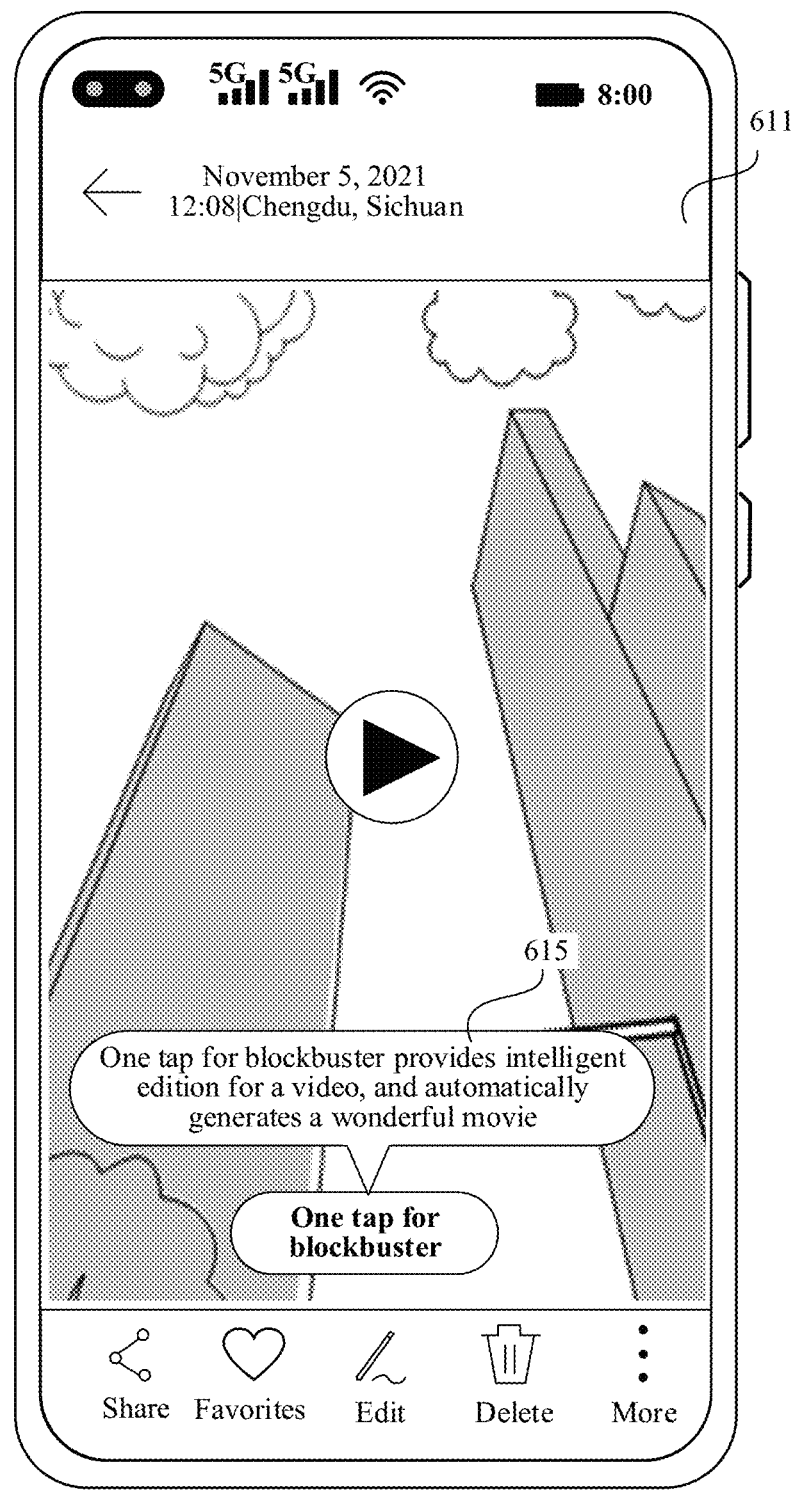
FIG. 6C(1)

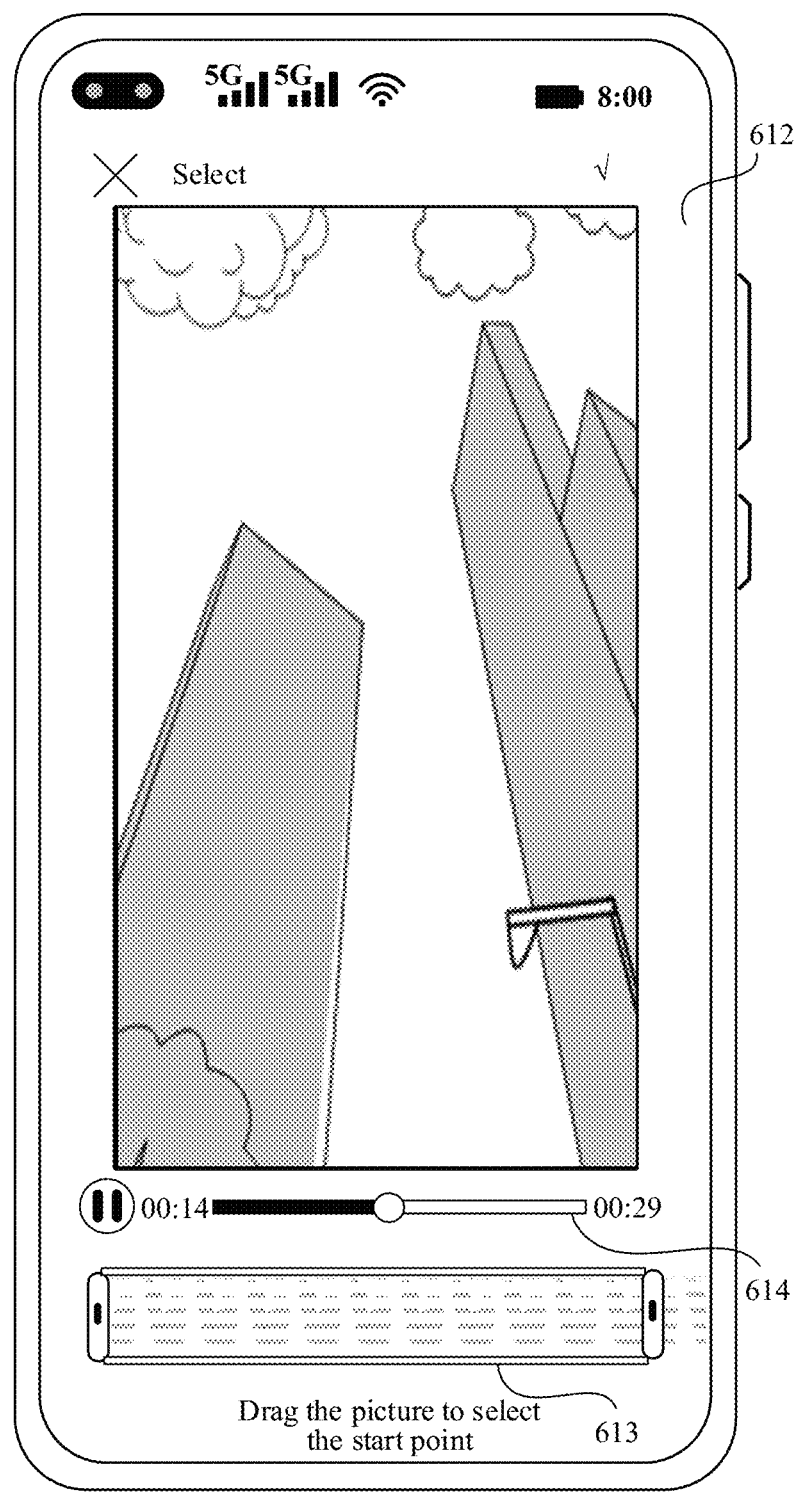
FIG. 6C(2)

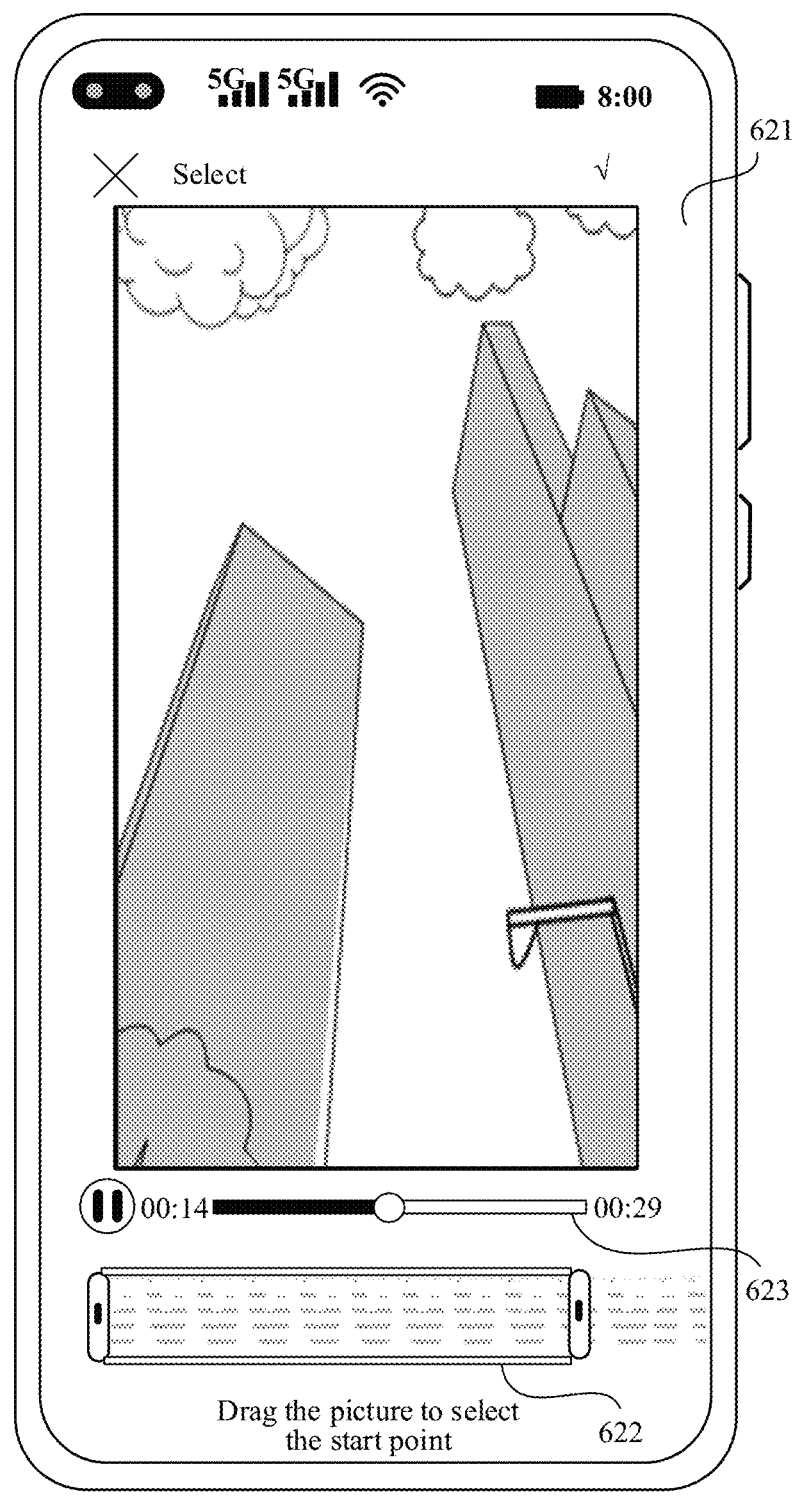
FIG. 6D(1)

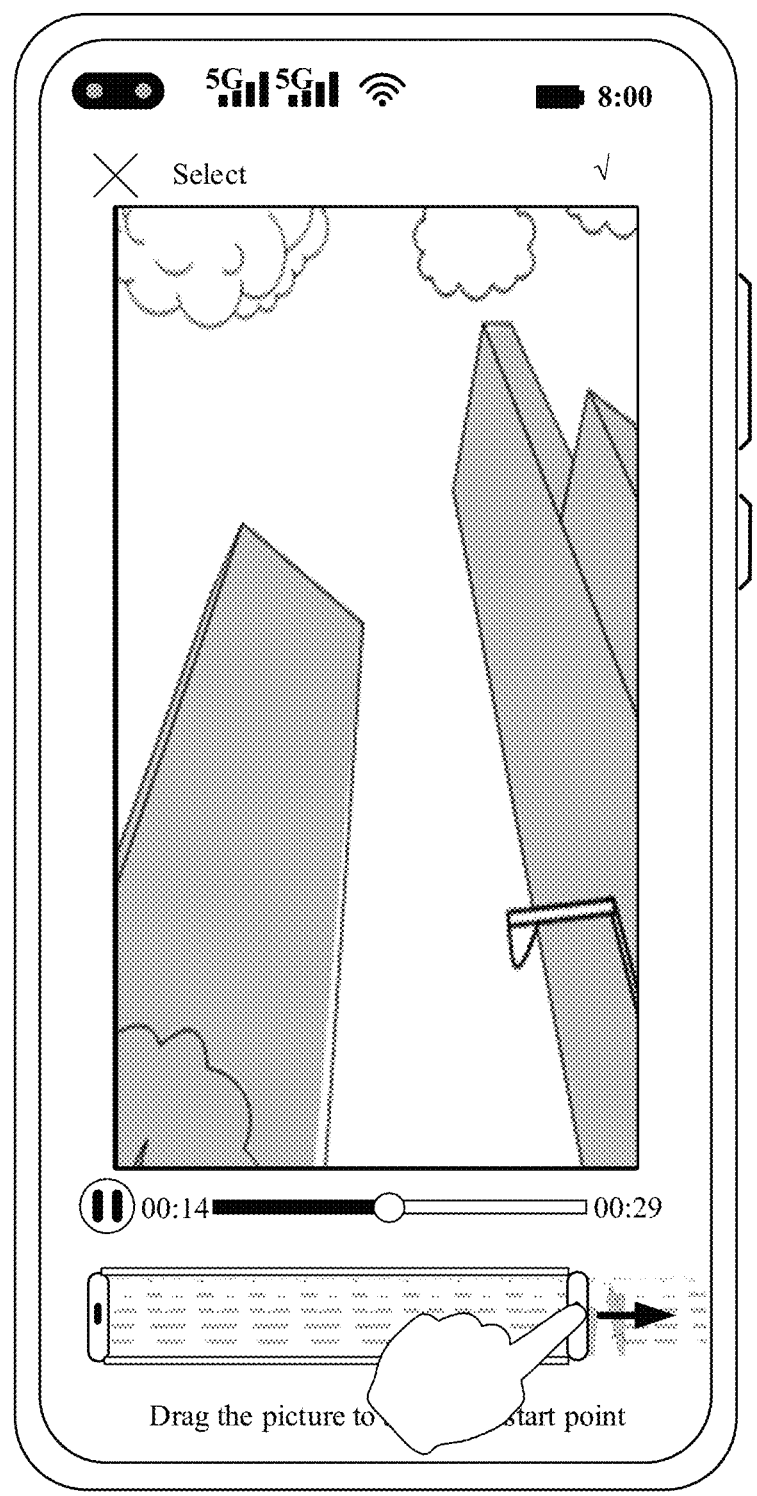
FIG. 6D(2)

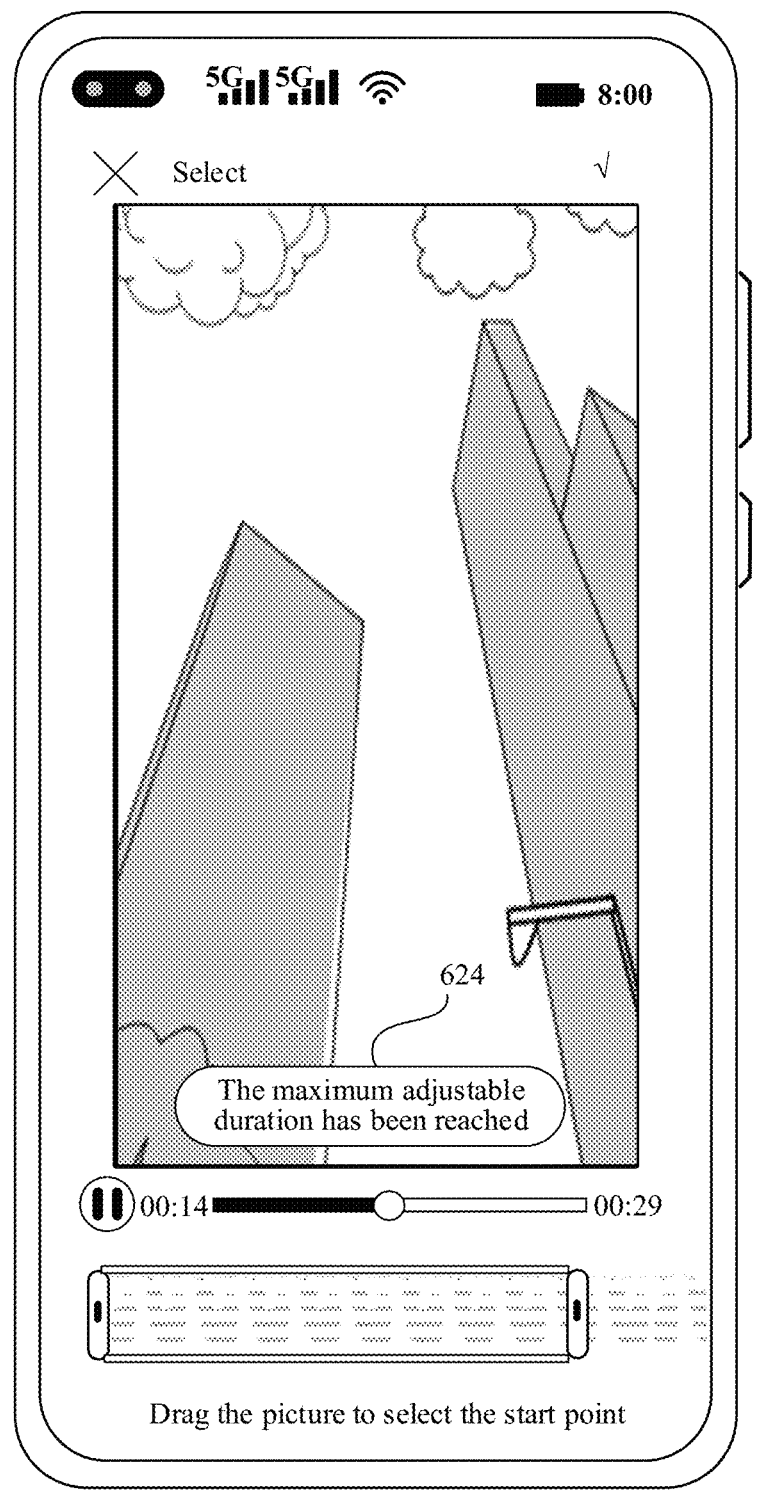
FIG. 6D(3)

FIG. 7A(1)

FIG. 7A(2)

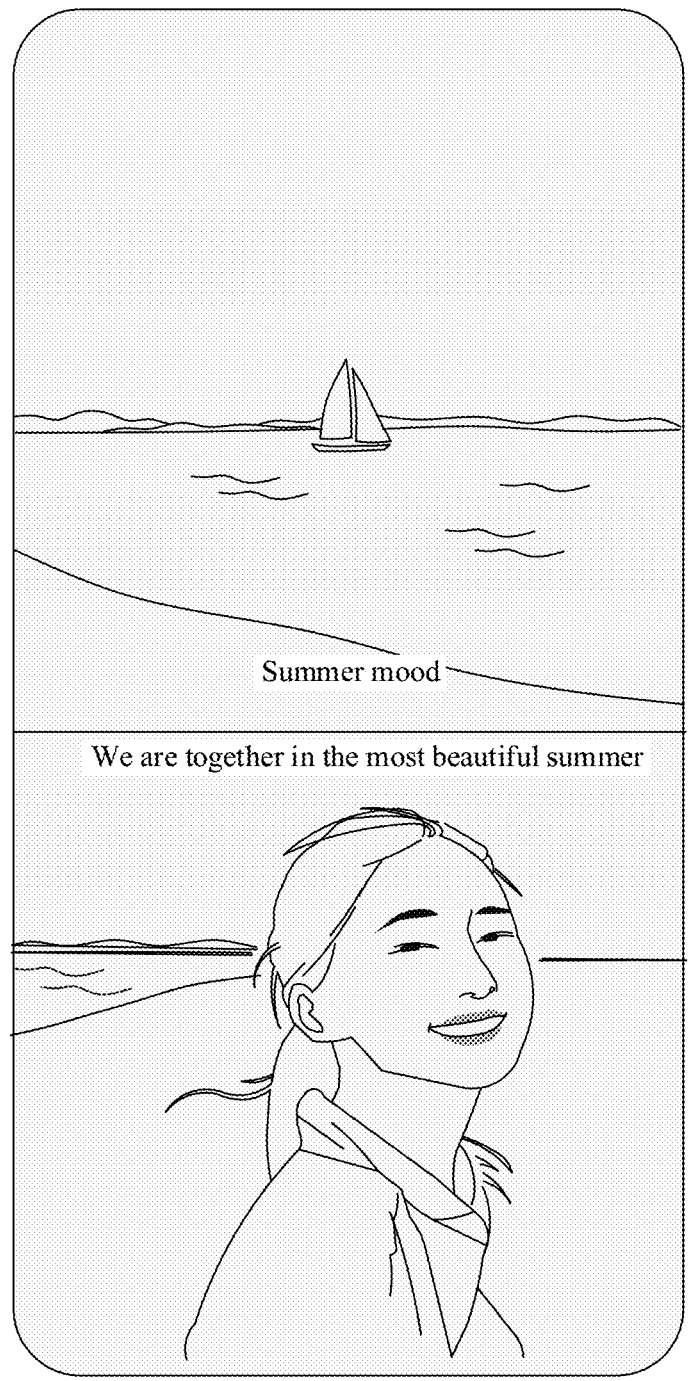
FIG. 7A(3)

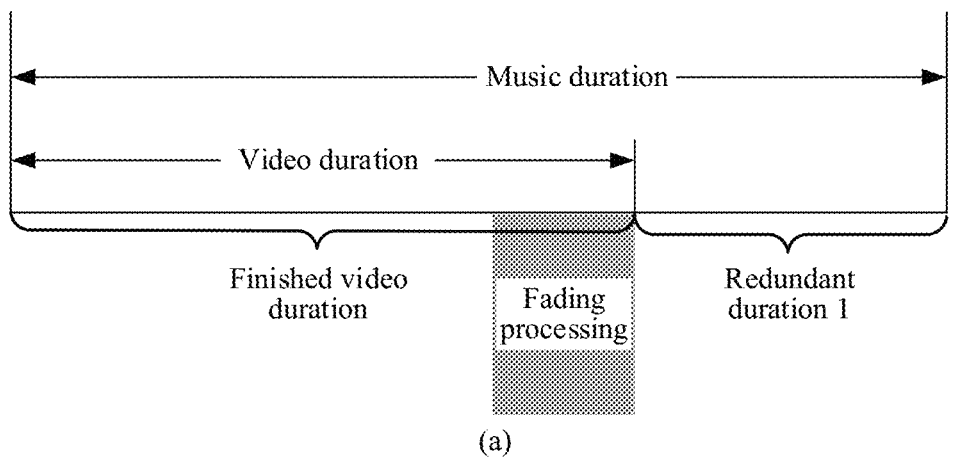
(a)
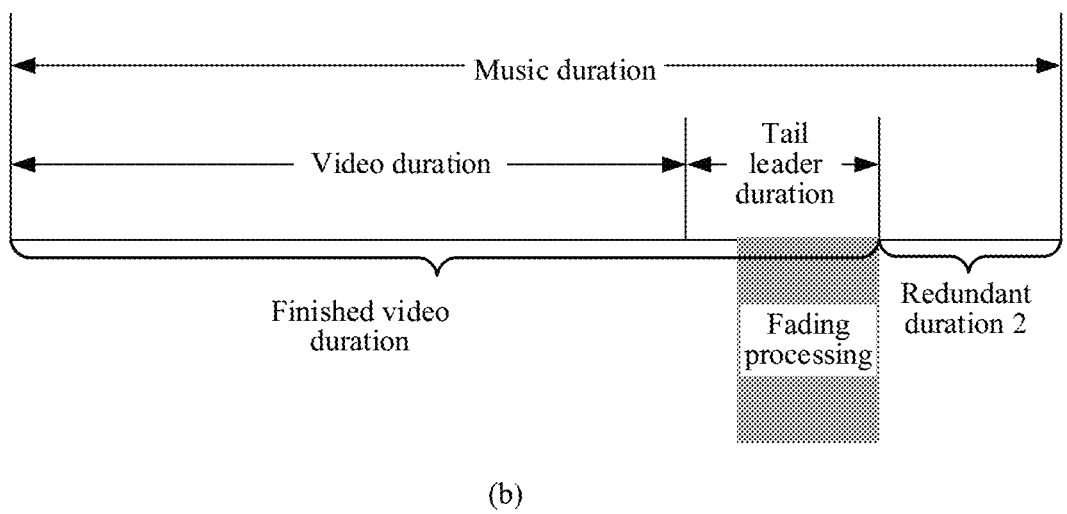
(b)
FIG. 7B

VIDEO PROCESSING METHOD AND ELECTRONIC DEVICE

This application is a national stage of International Application No. PCT/CN2022/094792, filed on May 24, 2022, which claims priority to Chinese Patent Application No. 202110676709.3, filed on Jun. 16, 2021, and Chinese Patent Application No. 202111439314.8, filed on Nov. 29, 2021, and Chinese Patent Application No. 202210038856.2, filed on Jan. 13, 2022. The disclosures of each of the aforementioned applications are hereby incorporated by reference in their entireties.

TECHNICAL FIELD

This application relates to the field of photographing technologies, and in particular, to a video processing method and an electronic device.

BACKGROUND

Electronic devices such as mobile phones and tablets provide functions such as video shooting and processing. Using a mobile phone as an example, a gallery application is provided in the mobile phone, and by using the gallery application, a video can be processed. For example, filters, soundtracks, and the like can be added to the video.

However, the inventor found in the process of implementing embodiments of this application that the video processing solution provided in the related art has at least the following defects. The electronic device can only complete the video processing based on separate settings of a user for various effects such as filters, soundtracks, and watermarks. The operation is cumbersome, resulting in low intelligence in video processing.

SUMMARY

Embodiments of this application provide a video processing method and an electronic device. For a same video, finished videos with different effects can be formed to enhance diversity of the finished videos.

According to a first aspect, an embodiment of this application provides a video shooting method, applicable to an electronic device supporting video shooting, such as a mobile phone and a tablet. The electronic device displays a first interface. The first interface includes a first option, and the first option displays a thumbnail of a frame of image in a first video. In response to a tap operation performed by a user on the first option on the first interface, the electronic device displays a second interface. The second interface is an editing interface of the first video, and the second interface further includes a first control. For example, the first control is a button "One tap for video clipping", and in response to a first operation performed by the user on the first control on the second interface, the electronic device generates a first finished video. The first finished video is a video obtained by the electronic device by adding a first video effect to the first video. So far, the electronic device adds the first video effect to the video in the electronic device.

Then the electronic device can display a third interface. The third interface includes a second option and the first option, and the second option displays a thumbnail of a frame of image in the first finished video. In other words, after adding the video effect to the first video, the electronic device can provide two options, namely, the first video and the first finished video, for selection. In addition, in response to a tap operation performed by the user on the first option on the third interface, the electronic device displays a fourth interface. The fourth interface is an editing interface of the first video, and the fourth interface further includes the first control. In response to the first operation performed by the user on the first control on the fourth interface, the electronic device generates a second finished video. The second finished video is a video obtained by the electronic device by adding a second video effect to the first video. The first video effect is different from the second video effect.

Based on the above, according to the method in this embodiment of this application, for the first video to which no video effect is added, the electronic device may add the video effect to the first video in response to an operation performed by the user on the first control, to form the first finished video. Then the electronic device still provides an option of the first video for the user. In addition, for the first video, in response to the operation performed by the user on the first control again, the electronic device can add a different video effect to the first video, to form a second finished video. Therefore, for a same video, finished videos with different effects can be formed to enhance diversity of the finished videos.

In a possible design manner of the first aspect, the first interface is an interface before recording a video or taking a picture in a camera application of the electronic device, or the first interface is an application interface of a gallery application in the electronic device. In addition, the third interface is an application interface of the gallery application.

In a possible design manner of the first aspect, that in response to a tap operation performed by a user on the first option on the first interface, the electronic device displays a second interface includes: In response to the tap operation performed by the user on the first option on the first interface, the electronic device displays the second interface if the first video is a video to which no video effect is added.

According to the method in this embodiment, the electronic device provides a function of adding a video effect only for the video to which no video effect is added, that is, the function of "One tap for video clipping". Therefore, the video effect is added in a targeted manner, and a video processing effect is improved.

In a possible design manner of the first aspect, the method further includes: In response to the tap operation performed by the user on the first option on the first interface, the electronic device displays a fifth interface if the first video is a video to which a video effect is added. The fifth interface is an editing interface of the first video, and the fifth interface does not include the first control.

According to the method in this embodiment, the electronic device does not provide the function of adding a video effect for the video to which the video effect is added, and only displays an ordinary editing interface, that is, the fifth interface. This avoids disorderly video effects.

In a possible design manner of the first aspect, after the electronic device displays the third interface, the method further includes: In response to a tap operation performed by the user on the second option, the electronic device displays a sixth interface. The sixth interface is an editing interface of the first finished video, and the sixth interface does not include the first control.

In this embodiment, the second option corresponds to the first finished video, and the first finished video is a finished video to which the video effect is added. Therefore, the electronic device does not provide the function of adding a video effect for the first finished video. This avoids disorderly video effects.

In a possible design manner of the first aspect, that in response to a tap operation performed by a user on the first option on the first interface, the electronic device displays a second interface includes: In response to the tap operation performed by the user on the first option on the first interface, the electronic device displays the second interface if video duration of the first video exceeds first duration, and the video duration of the first video does not exceed second duration. The first duration is less than the second duration.

It should be understood that if the video duration is excessively long or excessively short, a final finished video is not to be particularly ideal after the video effect is added. In this embodiment, the electronic device provides the function of adding a video effect only for a video whose video duration is within a specific duration range, and this can improve the video processing effect.

In a possible design manner of the first aspect, the method further includes: The electronic device displays a first prompt information at the same time when the electronic device displays the first control for the first time, where the first prompt information is used for prompting video duration applicable to a function of adding a video effect.

In this embodiment, when displaying the first interface for the first time, the electronic device prompts video duration applicable to the function of adding a video effect. Therefore, an application range of the function of adding a video effect is clearly indicated, and efficiency of human-machine interaction is improved.

In a possible design manner of the first aspect, the method further includes: In response to the tap operation performed by the user on the first option on the first interface, the electronic device displays a seventh interface if the video duration of the first video does not exceed the first duration, or the video duration of the first video exceeds the second duration. The seventh interface is an editing interface of the first video, and the seventh interface does not include the first control.

In this embodiment, if the video duration is excessively long or excessively short, the electronic device does not provide the function of adding a video effect for the video. In this way, the video processing effect can be improved.

In a possible design manner of the first aspect, the video duration of the first video exceeds the second duration. That in response to a first operation performed by the user on the first control on the second interface, the electronic device generates a first finished video includes: In response to the first operation performed by the user on the first control on the second interface, the electronic device displays an eighth interface. The eighth interface is an interface that the electronic device cuts the first video. In response to a second operation performed by the user on the eighth interface, the electronic device displays the first finished video. The first finished video is a video obtained by the electronic device by adding the first video effect to a target clip, the target clip belongs to the first video, and clip duration of the target clip does not exceed the second duration.

In this embodiment, for a video with excessively long video duration, if it is detected that a video effect needs to be added, the electronic device may first cut the video, and then add the video effect to the cut video. In this way, the electronic device can provide the function of adding a video effect for a long video. Therefore, the application range of the function of adding a video effect can be improved.

In a possible design manner of the first aspect, after the generating the first finished video, the method further includes: The electronic device displays a preview interface of the first finished video.

In this embodiment, after generating the finished video, the electronic device can directly display a preview, to directly preview the video effect, improving the human-machine efficiency.

In a possible design manner of the first aspect, the preview interface includes a second control, and the second control is configured to trigger the electronic device to edit a finished video. After the electronic device displays the preview interface of the first finished video, the method further includes: The electronic device displays the first finished video on the preview interface. In response to completion of playback of the first finished video, the electronic device displays second prompt information on the preview interface when the electronic device does not detect a third operation performed by the user on the second control. The second prompt information is used for prompting the electronic device to edit the first finished video.

In this embodiment, the electronic device can provide an editing prompt on the preview interface, to clearly instruct the user to continue to edit the finished video.

In a possible design manner of the first aspect, the fifth interface includes a second control, and the second control is configured to trigger the electronic device to edit a finished video. After the electronic device displays the preview interface of the first finished video, the method further includes: In response to the third operation performed by the user on the second control, the electronic device switches at least one effect of the first video effect. The at least one effect includes one or more of background music, a filter, a sticker, a picture frame, a transition, and a tail leader.

In this embodiment, the video effect added by the electronic device can be adjusted on the preview interface. Therefore, the video effect added by the electronic device can be broken, to form more diversified videos.

In a possible design manner of the first aspect, after the electronic device displays the preview interface of the first finished video, the method further includes: In response to a fourth operation performed by the user on the preview interface, the electronic device saves the first finished video. In response to completion of saving the first finished video, the electronic device displays a ninth interface. The ninth interface is an editing interface of the first finished video, and the ninth interface does not include the first control. That the electronic device displays a third interface includes: In response to a return operation input by the user on the ninth interface, the electronic device displays the third interface.

According to a second aspect, an embodiment of this application further provides an electronic device. The electronic device can support a function of video shooting. The electronic device includes a display screen, a memory, and one or more processors. The display screen, the memory, and the processor are coupled. The memory is configured to store computer program code, the computer program code includes computer instructions, and when the computer instructions are executed by the processor, the electronic device is enabled to perform the following steps. The electronic device displays a first interface. The first interface includes a first option, and the first option displays a thumbnail of a frame of image in a first video. In response to a tap operation performed by a user on the first option on the first interface, the electronic device displays a second interface. The second interface is an editing interface of the first video, and the second interface further includes a first control. In response to a first operation performed by the user on the first control on the second interface, the electronic device generates a first finished video. The first finished video is a video obtained by the electronic device by adding a first video effect to the first video. The electronic device displays a third interface. The third interface includes a second option and the first option, and the second option displays a thumbnail of a frame of image in the first finished video. In response to a tap operation performed by the user on the first option on the third interface, the electronic device displays a fourth interface. The fourth interface is an editing interface of the first video, and the fourth interface further includes the first control. In response to the first operation performed by the user on the first control on the fourth interface, the electronic device generates a second finished video. The second finished video is a video obtained by the electronic device by adding a second video effect to the first video. The first video effect is different from the second video effect.

In a possible design manner of the second aspect, the first interface is an interface before recording a video or taking a picture in a camera application of the electronic device, or the first interface is an application interface of a gallery application in the electronic device; and the third interface is an application interface of the gallery application.

In a possible design manner of the second aspect, when the computer instructions are executed by the processor, the electronic device is enabled to perform the following steps. In response to the tap operation performed by the user on the first option on the first interface, the electronic device displays the second interface if the first video is a video to which no video effect is added.

In a possible design manner of the second aspect, when the computer instructions are executed by the processor, the electronic device is enabled to perform the following steps. In response to the tap operation performed by the user on the first option on the first interface, the electronic device displays a fifth interface if the first video is a video to which a video effect is added. The fifth interface is an editing interface of the first video, and the fifth interface does not include the first control.

In a possible design manner of the second aspect, when the computer instructions are executed by the processor, the electronic device is enabled to perform the following steps. In response to a tap operation performed by the user on the second option, the electronic device displays a sixth interface. The sixth interface is an editing interface of the first finished video, and the sixth interface does not include the first control.

In a possible design manner of the second aspect, when the computer instructions are executed by the processor, the electronic device is enabled to perform the following steps. In response to the tap operation performed by the user on the first option on the first interface, the electronic device displays the second interface if video duration of the first video exceeds first duration, and the video duration of the first video does not exceed second duration. The first duration is less than the second duration.

In a possible design manner of the second aspect, when the computer instructions are executed by the processor, the electronic device is enabled to perform the following steps. The electronic device displays a first prompt information at the same time when the electronic device displays the first control for the first time, where the first prompt information is used for prompting video duration applicable to a function of adding a video effect.

In a possible design manner of the second aspect, when the computer instructions are executed by the processor, the electronic device is enabled to perform the following steps. In response to the tap operation performed by the user on the first option on the first interface, the electronic device displays a seventh interface if the video duration of the first video does not exceed the first duration, or the video duration of the first video exceeds the second duration. The seventh interface is an editing interface of the first video, and the seventh interface does not include the first control.

In a possible design manner of the second aspect, the video duration of the first video exceeds the second duration. When the computer instructions are executed by the processor, the electronic device is enabled to perform the following steps. In response to the first operation performed by the user on the first control on the second interface, the electronic device displays an eighth interface. The eighth interface is an interface that the electronic device cuts the first video. In response to a second operation performed by the user on the eighth interface, the electronic device displays the first finished video. The first finished video is a video obtained by the electronic device by adding the first video effect to a target clip, the target clip belongs to the first video, and clip duration of the target clip does not exceed the second duration.

In a possible design manner of the second aspect, when the computer instructions are executed by the processor, the electronic device is enabled to perform the following steps. The electronic device displays a preview interface of the first finished video.

In a possible design manner of the second aspect, the preview interface includes a second control, and the second control is configured to trigger the electronic device to edit a finished video. When the computer instructions are executed by the processor, the electronic device is enabled to perform the following steps. The electronic device plays the first finished video on the preview interface. In response to completion of playback of the first finished video, the electronic device displays second prompt information on the preview interface when the electronic device does not detect a third operation performed by the user on the second control. The second prompt information is used for prompting the electronic device to edit the first finished video.

In a possible design manner of the second aspect, the fifth interface includes a second control, and the second control is configured to trigger the electronic device to edit a finished video. When the computer instructions are executed by the processor, the electronic device is enabled to perform the following steps. In response to the third operation performed by the user on the second control, the electronic device switches at least one effect of the first video effect. The at least one effect includes one or more of background music, a filter, a sticker, a picture frame, a transition, and a tail leader.

In a possible design manner of the second aspect, when the computer instructions are executed by the processor, the electronic device is enabled to perform the following steps. In response to a fourth operation performed by the user on the preview interface, the electronic device saves the first finished video. In response to completion of saving the first finished video, the electronic device displays a ninth interface. The ninth interface is an editing interface of the first finished video, and the ninth interface does not include the first control. In response to a return operation input by the user on the ninth interface, the electronic device displays the third interface.

According to a third aspect, an embodiment of this application provides a chip system, where the chip system is used in an electronic device including a display screen and a memory. The chip system includes one or more interface circuits and one or more processors. The interface circuit and the processor are interconnected through a line. The interface circuit is configured to receive a signal from the memory of the electronic device, and send the signal to the processor, where the signal includes computer instructions stored in the memory. When the processor executes the computer instructions, the electronic device performs the method described in the first aspect and any possible design manner of the first aspect.

According to a fourth aspect, this application provides a computer storage medium. The computer storage medium includes computer instructions. When the computer instructions are run on an electronic device, the electronic device is enabled to perform the method described in the first aspect and any possible design manner of the first aspect.

According to a fifth aspect, this application provides a computer program product. When the computer program product is run on a computer, the computer is enabled to perform the method described in the first aspect and any possible design manner of the first aspect.

It can be understood that, for beneficial effects that can be achieved by the electronic device according to the second aspect, the chip system according to the third aspect, the computer storage medium according to the fourth aspect, and the computer program product according to the fifth aspect, reference may be made to the beneficial effect in the first aspect and any possible design manner of the first aspect. Details are not described herein again.

BRIEF DESCRIPTION OF THE DRAWINGS

FIG. 3A(1) and FIG. 3A(2) are a schematic diagram 2 of an interface of a mobile phone according to an embodiment of this application;

FIG. 3B(1), FIG. 3B(2), FIG. 3B(3), and FIG. 3B(4) are a schematic diagram 3 of an interface of a mobile phone according to an embodiment of this application;

FIG. 5A(1), FIG. 5A(2), and FIG. 5A(3) are a schematic diagram of an effect of a finished video according to an embodiment of this application;

FIG. 5B(1), FIG. 5B(2), and FIG. 5B(3) are a schematic diagram 5 of an interface of a mobile phone according to an embodiment of this application;

FIG. 6A is a schematic diagram of video duration according to an embodiment of this application;

FIG. 6B(1), FIG. 6B(2), FIG. 6B(3), and FIG. 6B(4) are a schematic diagram 6 of an interface of a mobile phone according to an embodiment of this application;

FIG. 6C(1) and FIG. 6C(2) are a schematic diagram 7 of an interface of a mobile phone according to an embodiment of this application;

FIG. 6D(1), FIG. 6D(2), and FIG. 6D(3) are a schematic diagram 8 of an interface of a mobile phone according to an embodiment of this application;

FIG. 7A(1), FIG. 7A(2), and FIG. 7A(3) are a schematic diagram 9 of an interface of a mobile phone according to an embodiment of this application;

FIG. 7B is a schematic diagram of music fading processing according to an embodiment of this application;

DETAILED DESCRIPTION OF ILLUSTRATIVE EMBODIMENTS

In descriptions of embodiments of this application, unless otherwise specified, "at least one" means one and "a plurality of" means two or more. Moreover, to clearly describe the technical solutions in embodiments of this application, in embodiments of this application, terms such as "first" and "second" are used to define same items or similar items whose functions and effects are substantially the same. A person skilled in the art may understand that the terms "first", "second", and the like, and do not limit a quantity and an execution order, and the terms "first", "second", and the like are not limited to be necessarily different. In addition, in the descriptions of embodiments of this application, unless otherwise specified, all the positions and forms of interface elements in schematic diagrams of interfaces are illustrative, and may be flexibly adjusted based on actual requirements during actual implementation.

An embodiment of this application provides a video processing method, and the method can be applied to an electronic device supporting video processing, such as a mobile phone and a tablet. The electronic device can provide a shortcut editing portal for a video in the electronic device. The electronic device can receive a preset operation performed by a user on the shortcut editing portal, such as a tap operation and a slide operation. In response to the preset operation, the electronic device can add a set of video effects such as background music, a filter, a special effect (for example, twinkling stars), a transition, a picture frame, and a sticker, to generate a finished video. For a same video, the electronic device can add different sets of video effects to the video in response to a plurality of preset operations performed by the user, to generate finished videos with different effects.

Based on the above, according to the method in this embodiment of this application, the electronic device can quickly add a set of video effects to the video in response to the preset operation performed by the user, improving intelligence and efficiency of video processing. In addition, for the same video, in response to the plurality of preset operations performed by the user, the finished videos with different effects can be formed, to enhance diversity of the finished videos.

For example, the electronic device in embodiments of this application may be a device supporting video processing such as a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)/virtual reality (virtual reality, VR) device. A specific form of the electronic device is not specifically limited in embodiments of this application.

Figure 1:
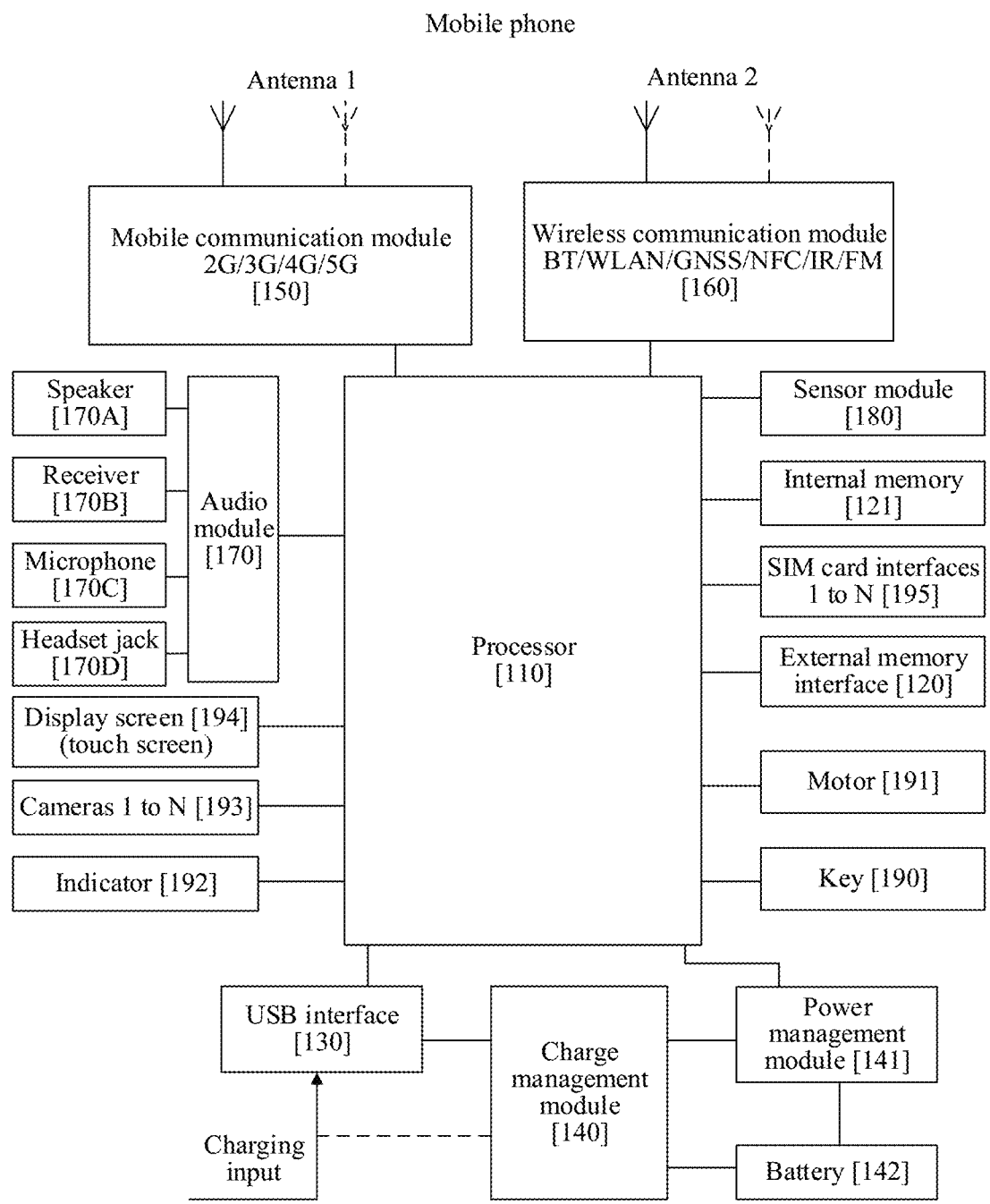
FIG. 1 is a schematic diagram of a hardware structure of a mobile phone according to an embodiment of this application.

FIG. 1 is a diagram of a hardware structure of an electronic device according to an embodiment of this application. As shown in FIG. 1, an example in which the electronic device is a mobile phone is used. The mobile phone may include a processor 110, an external memory interface 120, an internal memory 121, a universal serial bus (universal serial bus, USB) interface 130, a charge management module 140, a power management module 141, a battery 142, an antenna 1, an antenna 2, a mobile communication module 150, a wireless communication module 160, and an audio module 170, a speaker 170A, a receiver 170B, a microphone 170C, a headset jack 170D, a sensor module 180, a key 190, a motor 191, an indicator 192, a camera 193, a display screen 194, a subscriber identity module (subscriber identification module, SIM) card interface 195, and the like.

It may be understood that the schematic structure in this embodiment does not constitute a specific limitation on the electronic device. In some other embodiments, the electronic device may include more or fewer components than those shown in the figure, or some components may be combined, or some components may be split, or a different component arrangement may be used. Components shown in the figure may be implemented by using hardware, software, or a combination of software and hardware.

The processor 110 may include one or more processing units, for example, For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

It may be understood that, an interface connection relationship between the modules shown in this embodiment is merely an example for description, and does not constitute a limitation on the structure of the electronic device. In some other embodiments, the electronic device may alternatively use an interface connection manner different from that in the foregoing embodiment, or use a combination of a plurality of interface connection manners.

The charge management module 140 is configured to receive charging input from a charger. The charger may be a wireless charger, or may be a wired charger. In some embodiments of wired charging, the charge management module 140 may receive charging input from the wired charger through the USB interface 130. In some embodiments of wireless charging, the charge management module 140 may receive wireless charging input through a wireless charging coil of the electronic device 100. The charge management module 140 may supply power to the electronic device by the power supply management module 141 while charging the battery 142.

The power management module 141 is configured to connect the battery 142, the charge management module 140, and the processor 110. The power management module 141 receives input from the battery 142 and/or the charge management module 140, and supplies power to the processor 110, the internal memory 121, an external memory, the display screen 194, the camera 191, the wireless communication module 160, and the like. The power management module 141 may further be configured to monitor parameters such as a battery capacity, battery recycling times, and a battery health status (leakage and impedance). In some other embodiments, the power management module 141 may alternatively be disposed in the processor 110. In some other embodiments, the power management module 141 and the charge management module 140 may alternatively be disposed on a same device.

A wireless communication function of the electronic device may be implemented through the antenna 1, the antenna 2, the mobile communication module 150, the wireless communication module 160, the modem processor, the baseband processor, and the like.

The wireless communication module 160 can provide a solution to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication technology (near field communication, NFC), an infrared technology (infrared, IR), and the like to be applied to the electronic device 100. The wireless communication module 160 may be one or more components into which at least one communication processing module is integrated. The wireless communication module 160 receives an electromagnetic wave through the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave through the antenna 2 for radiation.

The electronic device implements a display function through the GPU, the display screen 194, the application processor, and the like. The GPU is a microprocessor for image processing and connects the display screen 194 and the application processor. The GPU is configured to perform mathematical and geometric calculation for graphics rendering. The processor 110 may include one or more GPUs, and the GPU executes program instructions to generate or change display information.

The electronic device may implement a shooting function through the ISP, the camera 193, the video codec, the GPU, the display screen 194, the application processor, and the like. The ISP is configured to process data fed back by the camera 193. The camera 193 is configured to capture a still image or a video. An optical image of an object is generated through a lens and is projected to a photosensitive element. In some embodiments, the electronic device may include one or N cameras 193, where N is a positive integer greater than 1.

The external memory interface 120 may be configured to be connected to an external storage card, for example, a Micro SD card, to expand a storage capacity of the electronic device. The external storage card communicates with the processor 110 through the external memory interface 120, to implement a data storage function, for example, store files such as music and a video in the external memory card.

The internal memory 121 may be configured to store computer executable program code, and the executable program code includes instructions. The processor 110 runs the instructions stored in the internal memory 121, to perform various functional applications and data processing of the electronic device. For example, the processor 110 may display different content on the display screen 184 in response to an operation of expanding the display screen 194 by the user by executing the instructions stored in the internal memory 121. The internal memory 121 may include a program storage region and a data storage region. The program storage region may store an operating system, an application required by at least one function (for example, a voice playing function and an image playing function), and the like. The data storage region may store data (for example, audio data and an address book) created during use of the electronic device, and the like. In addition, the internal memory 121 may include a high-speed random access memory, and may further include a non-volatile memory, for example, at least one magnetic disk storage device, a flash memory device, or a universal flash storage (universal flash storage, UFS).

The electronic device may implement an audio function through the audio module 170, the speaker 170A, the receiver 170B, the microphone 170C, the headset jack 170D, the application processor, and the like, for example, music playing and sound recording.

The key 190 includes a power on/off key, a volume key, and the like. The key 190 may be a mechanical key, or may be a touch key. The electronic device may receive key input and generate key signal input related to user settings and function control of the electronic device. The motor 191 may generate a vibration prompt. The motor 191 may be configured for an incoming call vibration prompt or a touch vibration feedback. The indicator 192 may be an indicator light, and may be configured to indicate a charging state or a power change, and may also be configured to indicate a message, a missed call, a notification, and the like. The SIM card interface 195 is configured to connect a SIM card. The SIM card may be inserted into the SIM card interface 195 or unplugged from the SIM card interface 195, to come into contact with or be separated from the electronic device. The electronic device can support one or N SIM card interfaces, where N is a positive integer greater than 1.

The following describes the method in embodiments of this application by using an example in which the electronic device is a mobile phone. The method in embodiments of this application may be applied to a video processing scenario. A to-be-processed video (or referred to as a first video) may be a video shot by the mobile phone, or may be a video downloaded from the Internet or stored in a cloud. In the following embodiment, an example in which the to-be-processed video is a video shot by the mobile phone is mainly used to describe the solution in this application.

Figure 2A:
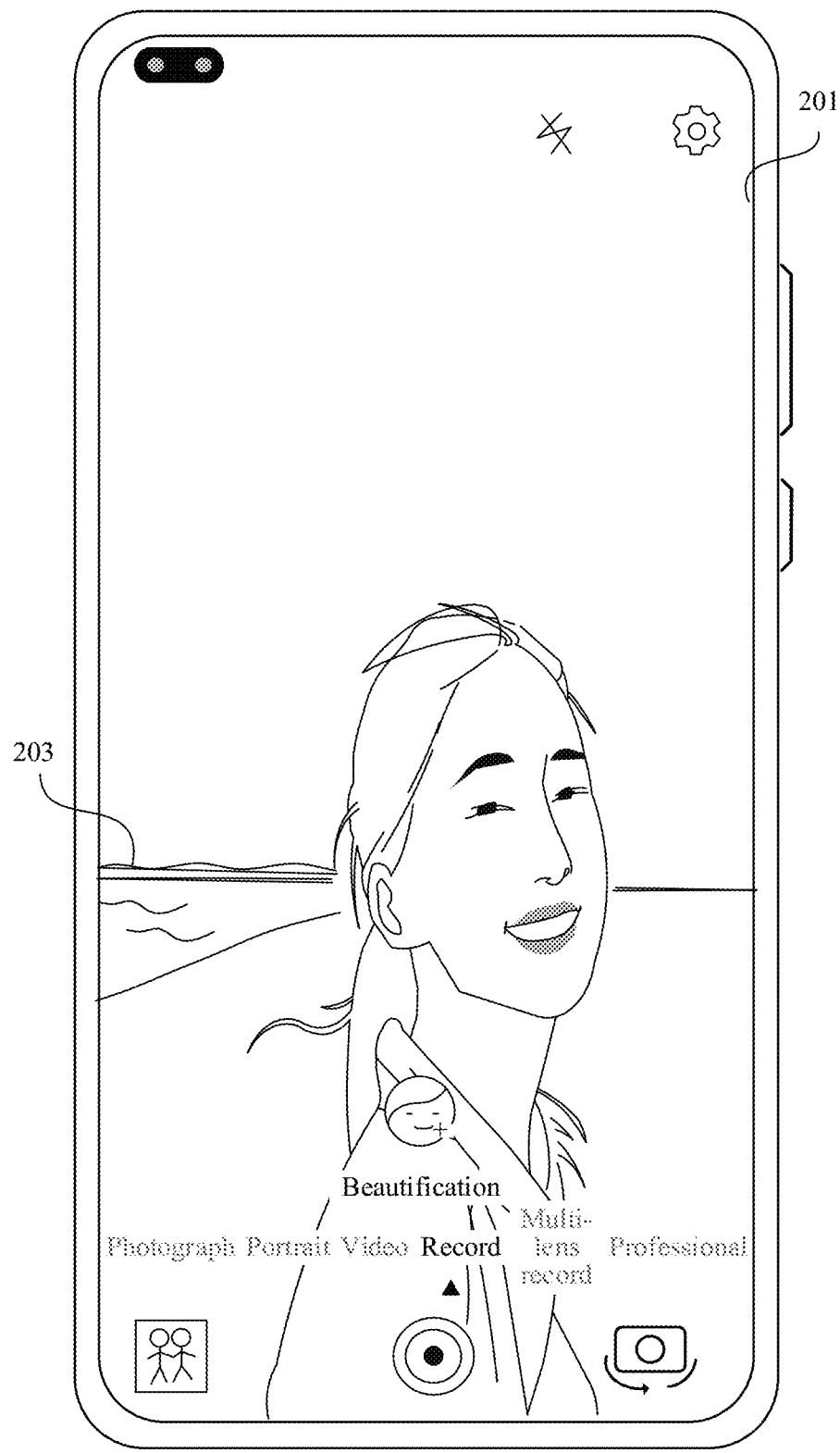
FIG. 2A and FIG. 2B are a schematic diagram 1 of an interface of a mobile phone according to an embodiment of this application.

Refer to FIG. 2A, in a scenario, the mobile phone may shoot in a single-lens recording mode to obtain the to-be-processed video. The single-lens recording mode is an ordinary recording mode in the conventional sense. In the single-lens recording mode, the mobile phone only uses one camera to shoot videos. For example, an interface 201 shown in FIG. 2A is a viewfinder interface in the single-lens recording mode before recording. The interface 201 only includes an image 202 captured by a single camera (for example, a front camera). When shooting starts in this situation, the mobile phone shoots in the single-lens recording mode.

Figure 2B:
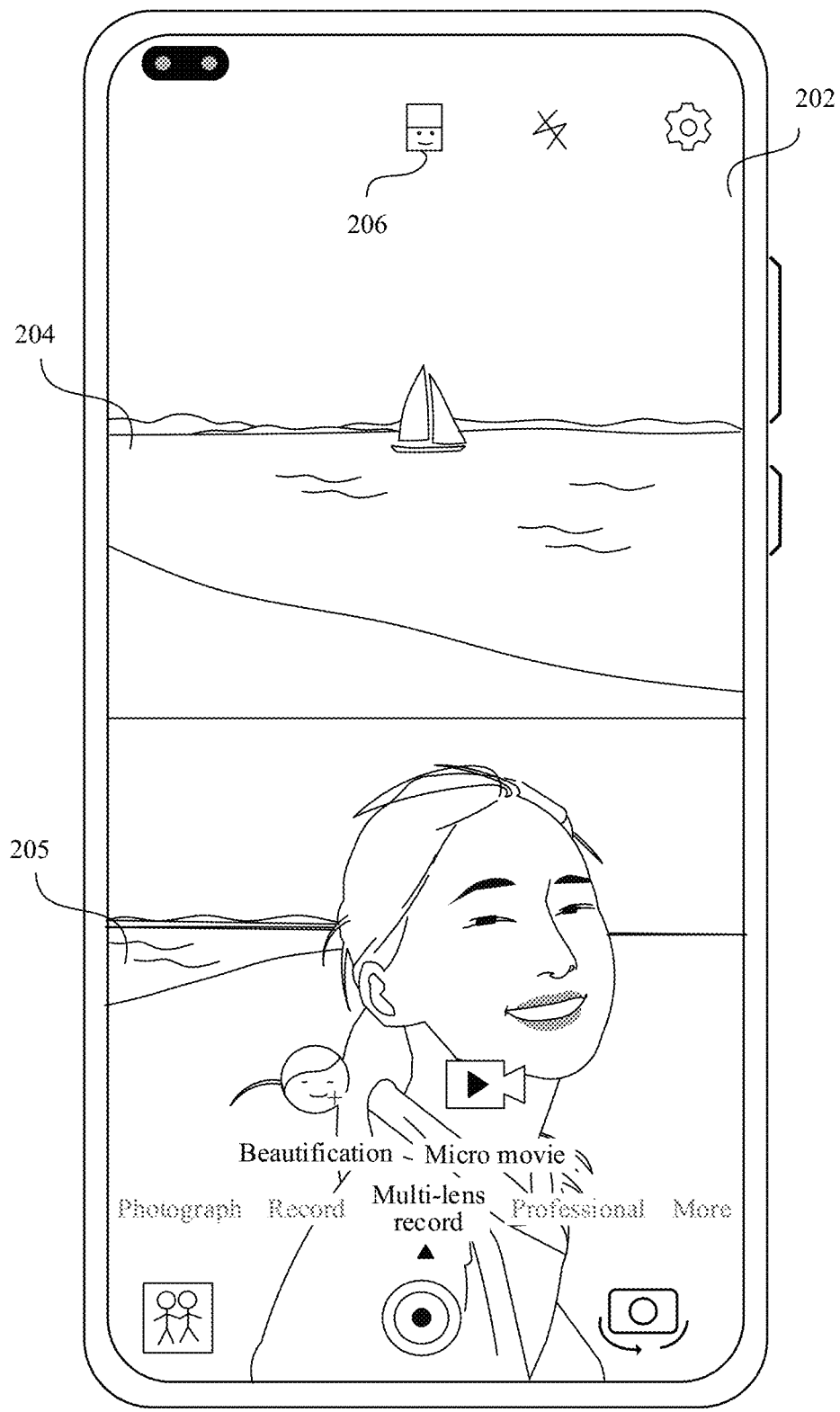

Refer to FIG. 2B, in another scenario, the mobile phone may shoot in a multi-lens recording mode to obtain the to-be-processed video. In the multi-lens recording mode, the mobile phone may use two or more cameras at the same time to shoot a video. For example, an interface 203 shown in FIG. 2B is a viewfinder interface in the multi-lens recording mode before recording. The interface 203 includes an image 204 and an image 205 captured by two cameras (for example, a rear main camera and a front camera). When shooting starts in this situation, the mobile phone shoots in the multi-lens recording mode. In the following embodiment, the solution in this application is mainly described in the multi-lens recording mode.

It should be noted that in the multi-lens recording mode, a switching operation, for example, tapping a switching button 206 on the interface 203, may be used for triggering the mobile phone to switch to using a single camera to shoot a video. To be distinguished from the single-lens recording mode, a mode of using a single camera to shoot video in the multi-lens recording mode may be noted as a multi-lens sub-mode.

Refer to FIG. 3A(1) and FIG. 3A(2), in the multi-lens recording mode, on the viewfinder interface before video shooting, for example, an interface 301, the mobile phone can receive an operation 1 by a user, and the operation 1 is used for triggering the mobile phone to start video shooting. For example, the viewfinder interface before shooting includes a control 1, for example, a button 302 on the interface 301 shown in FIG. 3A(1). The control 1 is configured to trigger the mobile phone to start video shooting, and the operation 1 may be a tap operation performed by the user on the control 1. In response to the operation 1, the mobile phone can start video shooting, and display a viewfinder interface during the video shooting, as an interface 303 shown in FIG. 3A(2). After the video shooting starts, the mobile phone can receive an operation 2, and the operation 2 is used for triggering the mobile phone to end the video shooting. For example, the viewfinder interface during shooting includes a control 2, for example, a button 304 on the interface 303. The control 2 is configured to trigger the mobile phone to end the video shooting, and the operation 2 may be a tap operation performed by the user on the control 2. In response to the operation 2, the mobile phone may end the video shooting, and store the shot video (which may be noted as a video 1, belonging to the first video).

It should be noted that, forms of the operation 1 and the operation 2 are not limited to the forms in the foregoing examples. For example, the operation 1 may alternatively be a slide operation performed by the user from a right edge to the left of the viewfinder interface before the video shooting. For another example, the operation 2 may alternatively be a double-tap operation performed by the user on the viewfinder interface during the video shooting. This is not specifically limited in this embodiment of this application.

Refer to FIG. 3B(1) and FIG. 3B(3). In some embodiments, after the video is stored, the mobile phone may restore displaying the viewfinder interface before the video shooting (or referred to as a first interface). The viewfinder interface before the video shooting includes a gallery resource control, and the gallery resource control may display a thumbnail of a frame of image in the video 1 (or referred to as a thumbnail of the video 1). For example, after the video is stored, the mobile phone may display an interface 311 shown in FIG. 3B(1), and the interface 311 is the viewfinder interface before the video shooting. A button 312 at a lower left position on the interface 311 is the gallery resource control, and the button 312 displays a thumbnail 313 of the video 1. For ease of description, the thumbnail may be referred to as an option, for example, the thumbnail of the video 1 is referred to as a first option. In addition, the gallery resource control may be configured to trigger the mobile phone to display a video corresponding to the thumbnail. The mobile phone can receive a tap operation, a long press operation, a slide operation, and the like by the user on the gallery resource control. The tap operation is used as an example for description below. In response to the tap operation performed by the user on the gallery resource control, the mobile phone may display an interface 1 (or referred to as a second interface), and the interface 1 is an editing interface of the video 1. For example, in response to a tap operation performed by the user on the button 312 shown in FIG. 3B(1), that is, the gallery resource control, the mobile phone may display an interface 316 shown in FIG. 3B(3), that is, the interface 1. On the interface 316, a video corresponding to the thumbnail 313 in the button 312 can be edited.

Refer to FIG. 3B(2) and FIG. 3B(3). In some other embodiments, after the video is stored, the mobile phone can synchronize the video 1 to the gallery application, and then an application interface of the gallery application (or referred to as a first interface) displays the thumbnail of the video 1. For example, after the video 1 is synchronized to the gallery application, the mobile phone can display an interface 314 shown in FIG. 3B(2), and the interface 314 is the application interface of the gallery application. The interface 314 includes a thumbnail 315 of the video 1. Similarly, the thumbnail of the video 1 may be referred to as a first option. In a process of displaying the application interface of the gallery application, the mobile phone can receive a tap operation performed by the user on the thumbnail on the application interface. In response to the tap operation performed by the user on the thumbnail of the video 1 on the application interface, the mobile phone may also display the interface 1 (or referred to as a second interface), and the interface 1 is an editing interface of the video 1. For example, an example in which the thumbnail 315 on the interface 314 shown in FIG. 3B(2) is a thumbnail of the video 1 is used, and the mobile phone can display the interface 316 shown in FIG. 3B(3), that is, the interface 1, in response to the tap operation performed by the user on the thumbnail 315. On the interface 316, the video 1 can be edited.

In some embodiments, the interface 1 may include a share control, a favorites control, an edit control, a delete control, and the like. For example, an example in which the interface 1 is the interface 316 shown in FIG. 3B(3) is used, the share control may be button a "Share", the favorites control may be a button "Favorites", and the like. In this way, basic video editing can be completed.

In this embodiment of this application, the interface 1 includes a control 3 (that is, a shortcut editing portal, or referred to as a first control), for example, a button "One tap for blockbuster" on the interface 316 shown in FIG. 3B(3). The control 3 is configured to trigger the mobile phone to use an effect template (for example, a template 1) to process the to-be-processed video (for example, the video 1). For ease of description, the processing function may be referred to as "One tap for blockbuster". In addition, an example in which the effect template used in the "One tap for blockbuster" is the template 1 is used to describe the solution in this application. Each effect template has a combination of effects such as background music, a filter, a special effect (for example, twinkling stars), a transition, a picture frame, a sticker that may be referred to video effects. In other words, each effect template corresponds to a set of video effects. Correspondingly, the mobile phone uses the effect template to add corresponding video effects to the video. For ease of description, a set of video effects corresponding to the template 1 may be referred to as a first video effect. The mobile phone can receive an operation 3 (or referred to as a first operation) by the user on the control 3. The operation 3 is used for triggering the mobile phone to use the template 1 to process the to-be-processed video (for example, the video 1). The operation 3 may be a tap operation, a long press operation, a slide operation, and the like by the user on the control 3. Alternatively, the operation 3 may be an upward slide operation performed by the user on the control 3. A form of the operation 3 is not specifically limited in this application. In the following embodiment, an example in which the operation 3 is the tap operation performed by the user on the control 3 is mainly used to describe the solution in this application. In response to the operation 3, the mobile phone may use the template 1 to process the to-be-processed video (for example, the video 1), to form a finished video (or may also be referred to as a first finished video). For example, the mobile phone may add a set of video effects such as the background music, the filter, the special effect, the transition, the picture frame, the sticker corresponding to the template 1 to the video 1, so that an effect of the finished video is completely consistent with the video effect corresponding to the template 1. For example, the effect of the finished video may be as shown in FIG. 3B(4), and the finished video has a deep gray filter, a sticker "Happy hour", and other effects.

In some scenarios, a video in the mobile phone may not be processed by using an effect template, for example, the video 1, or may be processed by using an effect template. For ease of description, a video processed by using an effect template may be noted as a video 2 (belonging to the first video). That the video is processed by using an effect template includes the following two situations. First situation: the video is processed by using "One tap for video clipping". For the "One tap for video clipping", refer to the description above, and details are not described herein again. Second situation: before the video shooting, an effect template (for example, the template 2) is selected, and after the video shooting, the shot video is processed by using the template 2 automatically, and a finished video is generated and stored in the mobile phone. For ease of description, a specific example is used to describe the second situation.

Figure 4A:
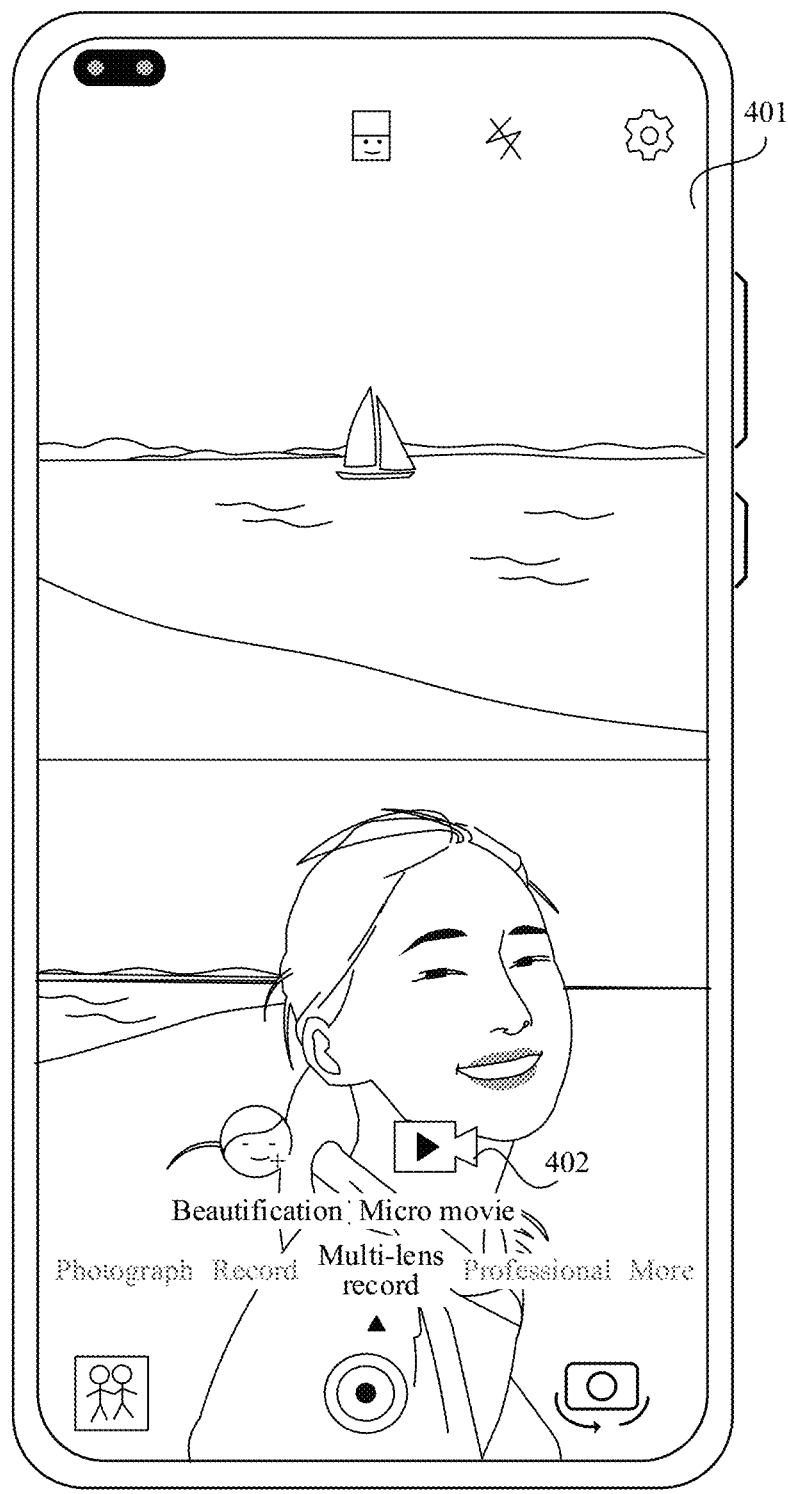
FIG. 4A, FIG. 4B, and FIG. 4C are a schematic diagram 4 of an interface of a mobile phone according to an embodiment of this application.
Figure 4B:
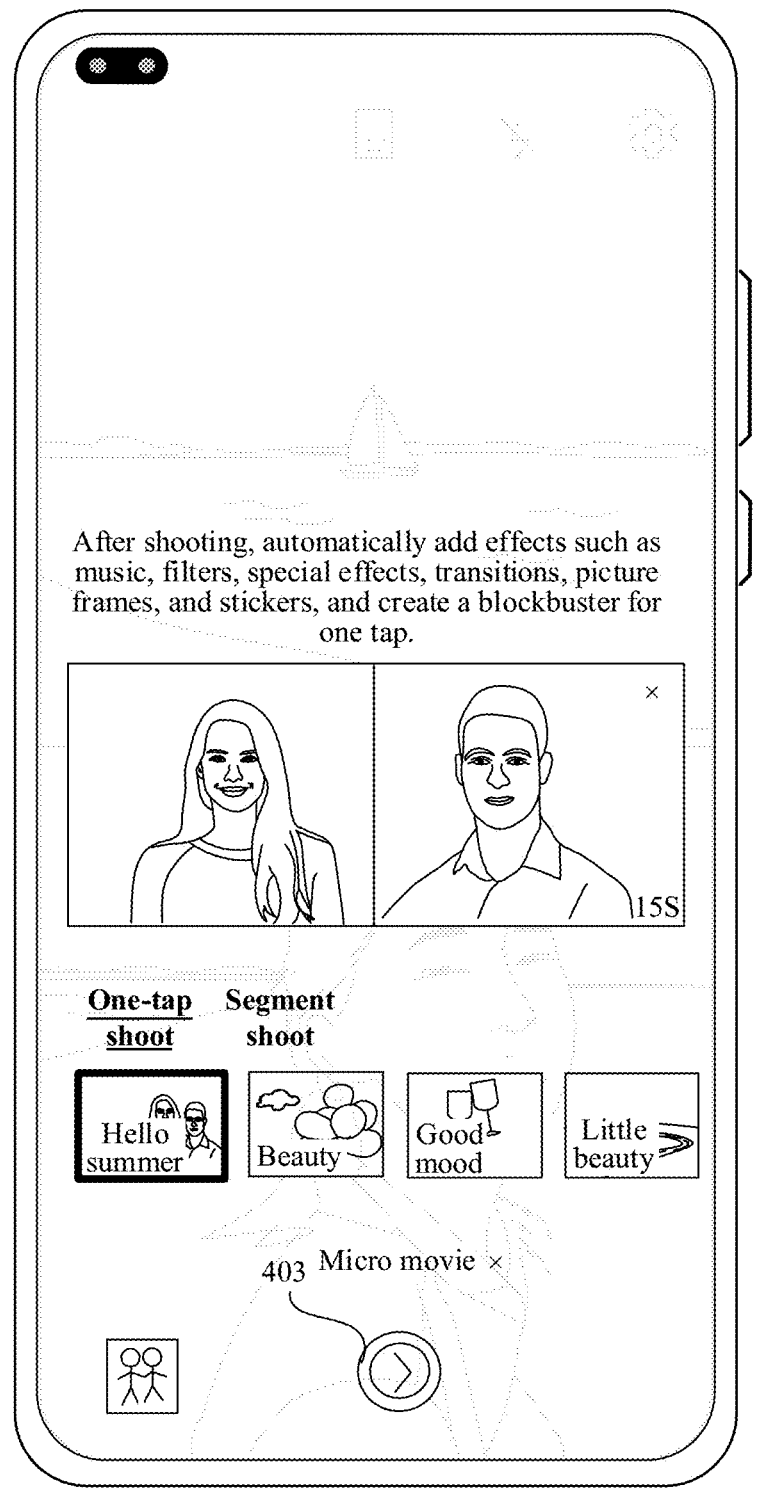
Figure 4C:
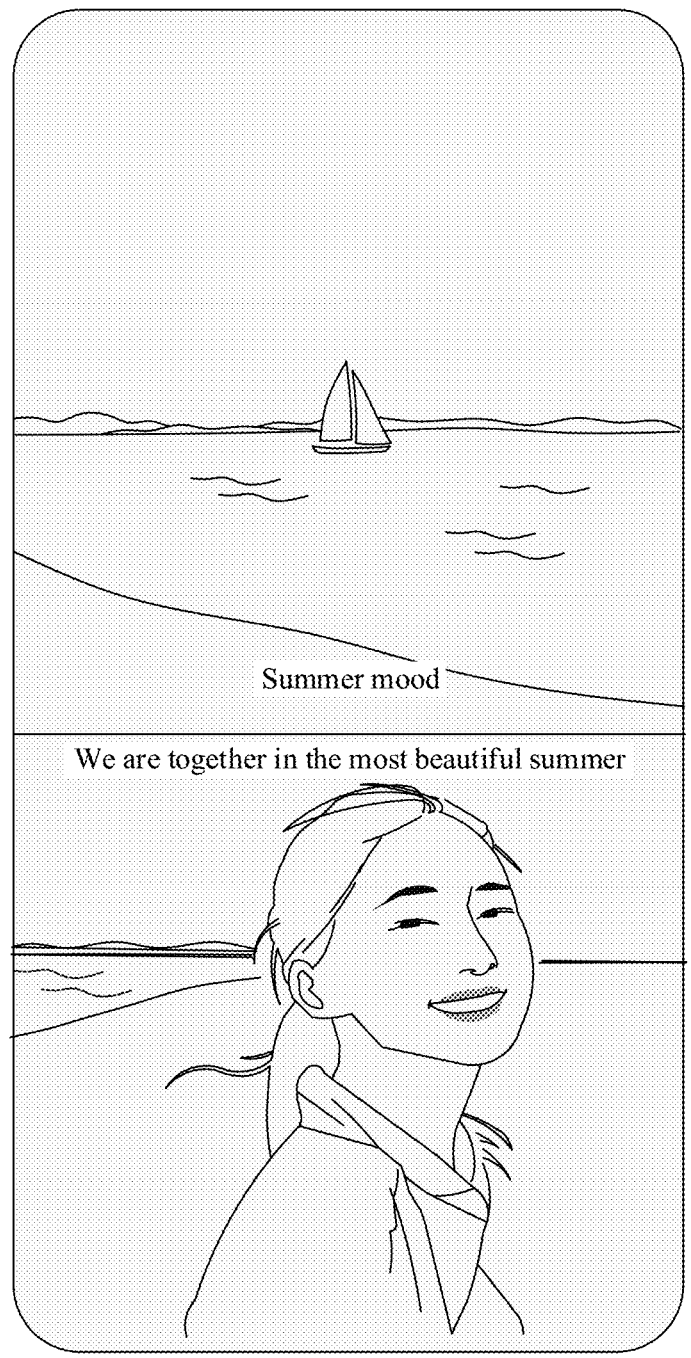

Refer to FIG. 4A, FIG. 4B, and FIG. 4C. For example, before the video shooting, the mobile phone may display an interface 401 shown in FIG. 4A. The interface 401 includes a button "Micro movie" 402, and the button "Micro movie" 402 is configured to trigger the mobile phone to select the effect template. The mobile phone can receive a tap operation performed by the user on the button "Micro movie" 402. In response to the tap operation performed by the user on the button "Micro movie" 402, the mobile phone can display a plurality of template options of effect templates, for example, template options of four templates "Hello summer", "Beauty", "Good mood", and "Little beauty" shown in FIG. 4B. Then, the mobile phone can receive a selection operation performed by the user on a template option 1 (for example, the option "Hello summer"). The template option 1 is any one of the plurality of template options. In response to the selection operation performed by the user on the template option 1, the mobile phone can select a corresponding effect template, for example, the "Hello summer". The mobile phone can receive an operation of starting shooting, for example, a tap operation performed by the user on a button 403 in FIG. 4B. In response to the operation of starting shooting, the mobile phone can start the video shooting. After the video shooting ends, the mobile phone can automatically use the selected effect template to process the shot video, to form a finished video (for example, the video 2) and store the video in the mobile phone. For example, the video 2 may have a light gray filter, a sticker "Summer mood, we are together in the most beautiful summer", and other effects, as shown in FIG. 4C.

The video 2 obtained in the foregoing two situations already has the background music, the filter, the sticker, and other effects. Based on this, if the "One tap for video clipping" is further used on the video 2, two set of effects may be superimposed, causing a poor finished video effect. For example, an effect shown in FIG. 5A(1) and an effect shown in FIG. 5A(2) are superimposed, obtaining an effect shown in FIG. 5A(3). The light gray filter and the deep gray filter are superimposed, so that a filter has an excessively dark color in the finished video, affecting a picture of original video content. In addition, the two stickers "Happy hour" and "Summer mood, we are together in the most beautiful summer" are superimposed, causing inconsistent themes of the video.

Based on this, in some embodiments, the mobile phone can add a processing identifier to videos in the mobile phone, add a first identifier to a video that is not processed by using the effect template (for example, the video 1), and/or add a second identifier to a video that is obtained that is processed by using the effect template (for example, the video 2). For example, after adding the identifier to the videos, the mobile phone can display an application interface 501 of the gallery application shown in FIG. 5B(1). The application interface 501 displays a thumbnail 502, a thumbnail 503, and a thumbnail 504. The thumbnail 503 and the thumbnail 504 are marked with a five-pointed star at the upper right corner, indicating that videos corresponding to the thumbnail 503 and the thumbnail 504 are videos that are processed by using the effect template. In other words, the five-pointed star is the second identifier. The thumbnail 502 is not marked with a five-pointed star at the upper right corner, indicating that a video corresponding to the thumbnail 502 is a video that is not processed by using the effect template.

In this embodiment, the mobile phone responds to a tap operation performed by the user on any thumbnail (which may be noted as a target thumbnail, or may be referred to as a first option) on the viewfinder interface before the video shooting or the application interface of the gallery application. If a processing identifier of a video corresponding to the thumbnail (noted as a target video and also belonging to the first video) is the first identifier, or the processing identifier of the target video is not the second identifier, the mobile phone can display the interface 1. For the interface 1, refer to the descriptions in the foregoing embodiments, and details are not described herein again. For example, the target thumbnail is the thumbnail 503 shown in FIG. 5B(1). The thumbnail 503 is not marked with a five-pointed star (that is, the second identifier) at the upper right corner, indicating that the target video is a video that is not processed by using the effect template. In response to the tap operation performed by the user on the thumbnail 503, the mobile phone can display an interface 505 shown in FIG. 5B(2). The interface 505 includes a control 3, for example, the button "One tap for video clipping". In other words, the interface 505 is the interface 1.

The mobile phone responds to the tap operation performed by the user on the target thumbnail on the viewfinder interface before the video shooting or the application interface of the gallery application. If the processing identifier of the target video is the second identifier, or the processing identifier of the video is not the first identifier, the mobile phone can display the interface 2. For ease of description, the interface 2 in this embodiment may be referred to as a fifth interface. The interface 2 is also an editing interface of the video, but the interface 2 does not include the control 3. For example, a video 3 is a video corresponding to a thumbnail 504 shown in FIG. 5B(1). The thumbnail 504 is marked with a five-pointed star (that is, the second identifier) at the upper right corner, indicating that the video corresponding to the thumbnail 504 is a video that is processed by using the effect template. In response to the tap operation performed by the user on the thumbnail 504, the mobile phone can display an interface 506 shown in FIG. 5B(3). The interface 506 includes the target video, but does not include the control 3, for example, the button "One tap for video clipping". In other words, the interface 506 is the interface 2.

In other words, the mobile phone responds to the tap operation performed by the user on the target thumbnail on the viewfinder interface before the video shooting or the application interface of the gallery application. If the target video is not a video (for example, the video 1) to which the mobile phone adds a video effect based on the effect template, the mobile phone can display the interface 1, and the interface 1 provides the control 3. If the target video is a video (for example, the video 2) to which the mobile phone adds a video effect based on the effect template, the mobile phone can display the interface 2, and the interface 2 does not provide the control 3.

According to this embodiment, the control 3 is only provided for the video that is not processed by using the effect template, to implement "One tap for video clipping". Therefore, the "One tap for video clipping" can be implemented in a targeted manner, to improve a video processing effect.

In some other embodiments, the mobile phone can provide the control 3 for all the videos, and record correspondence between each video that is obtained after the mobile phone adds the video effect based on the effect template (for example, the video 2) and a corresponding original video (for example, the video 1) at the same time. Then, when the mobile phone performs the "One tap for video clipping" on the video that is obtained after the mobile phone adds the video effect based on the effect template (for example, the video 2), the corresponding original video can be searched for, and a video effect is added based on the original video to obtain a new video.

According to this embodiment, when the mobile phone performs the "One tap for video clipping" on the video that is obtained after the mobile phone adds the video effect based on the effect template, a manner in which the original video is searched for and then processed is used, to avoid superimposition of video effects. Therefore, the video processing effect is improved.

In addition, video duration of the videos in the mobile phone is different. For example, in FIG. 5B(1), the video corresponding to the thumbnail 502 has video duration of 00:10, that is 10 seconds (s); the video corresponding to the thumbnail 503 has video duration of 00:15, that is 15 s; and the video corresponding to the thumbnail 504 has video duration of 00:08, that is, 8 s. In some scenarios, when the "One tap for video clipping" is performed on a video based on the effect template, if video duration is excessively short, an effect corresponding to the effect template may not be well presented.

For example, the template 1 includes effects of a transition, an opening fade-in, and an ending fade-out, with required duration of 1.5 s, 2 s and 1.5 s respectively. As shown in (a) in FIG. 6A, the video duration is 8 s. If the template 1 is used for performing the "One tap for video clipping" on a video shown in (a) in FIG. 6A, 1.5 s of video frames at the beginning is required for a fade-in effect, 1.5 s of video frames at the end is required for a fade-out effect, and intermediate 2 s of video frames is required for a transition effect. Only 3 s of video frames of the whole video can be normally displayed, causing a poor effect of the "One tap for video clipping".

Based on this, in some embodiments, the mobile phone responds to the tap operation performed by the user on the target thumbnail on the viewfinder interface before the video shooting or the application interface of the gallery application. If video duration of the target video (that is, the video corresponding to the target thumbnail) exceeds duration 1 (or referred to as first duration), the mobile phone can display the interface 1. For the interface 1, refer to the descriptions in the foregoing embodiments, and details are not described herein again.

For example, an example in which the duration 1 is 10 s, and the target thumbnail is a thumbnail 602 on the application interface 601 of a camera application shown in FIG. 6B(1) is used, video duration of a video corresponding to the thumbnail 602, that is, the target video, is 00:15, that is, 15 s, which exceeds the duration 1. In response to the tap operation performed by the user on the thumbnail 602, the mobile phone can display an interface 604 shown in FIG. 6B(2). The interface 604 includes the control 3, for example, the button "One tap for video clipping". In other words, the interface 604 is the interface 1, and the interface may also be obtained after the user taps the control 312 on the interface 311. The interface includes a prompt information 608 "One tap for blockbuster provides intelligent editing for a video with duration of 10 to 29 seconds, and automatically generates a wonderful movie". The prompt information may alternatively be other proper content, for example, "Record videos between 10 and 35 seconds, and a movie can be made with one tap". This is not limited in this application.

The mobile phone responds to the tap operation performed by the user on the target thumbnail on the viewfinder interface before the video shooting or the application interface of the gallery application. If the video duration of the target video does not exceed the duration 1, the mobile phone can display the interface 2. For ease of description, the interface 2 in this embodiment may be referred to as a seventh interface. The interface 2 is also an editing interface of the video, but the interface 2 does not include the control 3. For example, an example in which the duration 1 is 10 s, and the target thumbnail is a thumbnail 603 on the application interface 601 of the camera application shown in FIG. 6B(1) is used, video duration of the video corresponding to the thumbnail 603, that is, the target video, is 00:08, that is, 8 s, which does not exceed the duration 1. In response to the tap operation performed by the user on the thumbnail 603, the mobile phone can display an interface 605 shown in FIG. 6B(3). The interface 605 includes the target video, but does not include the control 3, for example, the button "One tap for video clipping". In other words, the interface 605 is the interface 2.

In this embodiment, the duration 1 may be a value set based on experience, for example, 5 s, 8 s, or 10 s. Alternatively, the mobile phone can store a plurality of effect templates, and each effect template has respective template duration. Generally, when the to-be-processed video (for example, the video 1) has video duration at least close to the template duration, a good finished video effect can finally be presented. For example, the template 1 has template duration of 15 s, the template 1 includes three transition effects, each transition has duration of 2 s, then the transition effects need 6 s, and an average interval between two transitions is 3 s. If the video duration is less than 15 s, the interval between two transitions is shorter, resulting in a poor finished video effect. Based on this, the duration 1 may be set less than the shortest template duration.

For example, the template duration of the plurality of effect templates stored in the mobile phone is shown as the following Table 1.

TABLE 1

| Effect Template | Template Duration |
| --- | --- |
| Hello summer | 15 s |
| Beauty | 15 s |
| Good mood | 20 s |
| Little beauty | 25 s |

In Table 1, the shortest template duration is 15 s. When the template duration of the video 1 is shorter than 15 s, using any effect template in Table 1 for processing the video 1 cannot obtain a good finished video effect. Therefore, the duration 1 is set to a value less than 15 s, for example, 10 s. For a subsequent video less than 10 s, the function of "One tap for video clipping" may not be provided.

In this embodiment, the control 3 is only provided for a video whose video duration exceeds the duration 1, to implement the "One tap for video clipping", and therefore, the "One tap for video clipping" can be implemented in a targeted manner, to improve a video processing effect.

In some scenarios, when the "One tap for video clipping" is performed on a video based on a template effect, if the video duration is excessively long, it may be difficult for an effect corresponding to the effect template to match the video. For example, a set of effects corresponding to the template 1 includes background music, and a music duration of the background music is 30 s. As shown in (b) in FIG. 6A, the video duration is 35 s, if the template 1 is used to perform the "One tap for video clipping" on the video, the background music of the template 1 can only cover video frames of first 30 s, remaining 5 s is not covered by the background music, and therefore, this also affects the finished video effect. Alternatively, in a scenario of video shooting in a multi-lens recording mode, a plurality of cameras are used for recording. If the video duration is excessively long, a video file is relatively large, which is not conducive to processing of the "One tap for video clipping" subsequently, and a final finished video is large, which is not convenient for storage and uploading and sharing.

Based on this, in some embodiments, the mobile phone responds to the tap operation performed by the user on the target thumbnail on the viewfinder interface before the video shooting or the application interface of the gallery application. If the video duration of the target video (that is, the video corresponding to the target thumbnail) that does not exceed duration 2 (or referred to as second duration), the mobile phone can display the interface 1. For example, an example in which the duration 2 is 29 s, and the target thumbnail is a thumbnail 602 on the application interface 601 of a camera application shown in FIG. 6B(1) is used. Because video duration of the video corresponding to the thumbnail 602, that is, the target video, is 00:15, that is, 15 s, does not exceed the duration 2. In response to the tap operation performed by the user on the thumbnail 602, the mobile phone can display an interface 604 shown in FIG. 6B(2). The interface 604 includes the target video, and includes the control 3, for example, the button "One tap for video clipping". In other words, the interface 604 is the interface 1.

The mobile phone responds to the tap operation performed by the user on the target thumbnail on the viewfinder interface before the video shooting or the application interface of the gallery application. If the video duration of the target video exceeds the duration 2, the mobile phone can display the interface 2. For ease of description, the interface 2 in this embodiment may be referred to as a seventh interface. The interface 2 is also an editing interface of the video, but the interface 2 does not include the control 3. For example, an example in which the duration 2 is 29 s, and the target thumbnail is a thumbnail 606 on the application interface 601 of the camera application shown in FIG. 6B(1) is used. Because video duration of a video corresponding to the thumbnail 606, that is, the target video, is 00:35, that is, 35 s, which exceeds the duration 2, in response to the tap operation performed by the user on the thumbnail 606, the mobile phone can display an interface 607 shown in FIG. 6B(4). The interface 607 includes the target video, but does not include the control 3, for example, the button "One tap for video clipping". In other words, the interface 607 is the interface 2.

In this embodiment, the duration 2 may be a value set based on experience. For example, in a scenario of video shooting in a multi-lens recording mode, video duration of more than 30 s will cause an excessively large video file, and is not conducive to post-processing, storage, and the like. Therefore, video duration may be set to 30 s. Alternatively, the mobile phone may store a plurality of effect templates, and a set of effects of each effect template includes background music. Generally, the background music needs to cover the to-be-processed video (for example, the video 1), to present a good finished video effect. For example, as shown in (b) in FIG. 6A, the video duration is longer than the music duration, and therefore, a part of the finished video does not have background music, resulting in a poor finished video effect. Based on this, the duration 2 may be set longer than or equal to the longest music duration. When the to-be-processed video has video duration that exceeds the duration 2, that is, the longest music duration, the background music cannot cover the whole video by using any effect template to process the to-be-processed video. Subsequently, the function of "One tap for video clipping" may not be provided. For example, the music duration of the longest background music is 30 s, and the duration 2 may be set to duration greater than or equal to 30 s, for example, 30 s. Further, a set of effects of the effect template may further include a tail leader. The tail leader has fixed content, for example, a logo (logo) of the mobile phone merchant, and is usually unrelated to content of the shot video. Generally, the background music needs to cover the to-be-processed video and the tail leader, to present a good finished video effect. For example, excessively long video duration may cause the background music not to cover the tail leader. Based on this, the duration 2 may be set longer than or equal to a difference between the longest music duration and tail leader duration. For example, the music duration of the longest background music is 30 s, the tail leader duration is 1 s, and therefore, the duration 2 may be set to 29 s.

In this embodiment, the control 3 is only provided for a video whose video duration does not exceed the duration 2, to implement the "One tap for video clipping", and therefore, the "One tap for video clipping" can be implemented in a targeted manner, to improve the video processing effect.

It should be understood that during actual implementation, the foregoing implementation in which the control 3 is provided only for the video whose video duration exceeds the duration 1 and the foregoing implementation in which the control 3 is provided only for the video whose video duration does not exceed the duration 2 can be combined for use. In other words, in some other embodiments, the mobile phone may provide the control 3 only for the video whose video duration exceeds the duration 1 and does not exceed the duration 2. The duration 1 is less than the duration 2.

In the foregoing embodiment proposed for the problem caused by the video duration being excessively long or excessively short, when the mobile phone provides the control 3 for the first time, the mobile phone can also display a prompt information 1 (or referred to as a first prompt information) at the same time, and the prompt information 1 is used for prompting the video duration applicable to the "One tap for blockbuster". For example, the interface 1 displayed for the first time is the interface 604 shown in FIG. 6B(2), and the interface 604 includes the control 3, for example, the button "One tap for video clipping". The interface 604 further includes a prompt 608. Specific content of the prompt 608 is "One tap for blockbuster provides intelligent edition for a video with duration of 10 to 29 seconds, and automatically generates a wonderful movie", thereby prompting video duration applicable to the "One tap for blockbuster". In other words, the prompt 608 is the prompt information 1.

In addition, for the problem caused by the excessively long video duration, in some other embodiments, for a video with any duration, the mobile phone can provide the control 3. For example, an example in which the duration 2 is 29 s, and the target thumbnail is the thumbnail 606 on the interface 601 shown in FIG. 6B(1) is used. A video corresponding to the thumbnail 606, that is the target video, has video duration of 00:35, that is, 35 s, which exceeds the duration 2. In response to the tap operation performed by the user on the thumbnail 606, the mobile phone can display an interface 611 shown in FIG. 6C(1). The interface 611 also includes the control 3, that is, the button "One tap for video clipping". In other words, the target video has video duration that exceeds the duration 2, and the mobile phone can also provide the control 3, to trigger use of the "One tap for blockbuster".

In this embodiment, the mobile phone can provide the control 3 for a video with any duration, and a prompt information 2 may be displayed when the control 3 is provided for the first time. The prompt information 2 is only used for prompting the function of "One tap for video clipping", and is not required for prompting the video duration applicable to the "One tap for blockbuster". For example, the interface 1 displayed for the first time is the interface 611 shown in FIG. 6C(1), and the interface 611 includes the control 3, for example, the button "One tap for video clipping". The interface 611 further includes a prompt 615. Specific content of the prompt 615 is "One tap for blockbuster provides intelligent edition for a video, and generates a wonderful movie", thereby prompting the function of "One tap for blockbuster". In other words, the prompt 615 is the prompt information 2.

Subsequently, the mobile phone can receive the operation 3 by the user, for example, a tap operation on the button "One tap for video clipping". In response to the operation 3, if the target video has video duration that does not exceed the duration 2, the mobile phone can use the template 1 to process the target video, to form a finished video. In response to the operation 3, if the target video has video duration that exceeds the duration 2, the mobile phone can display an interface 3 (or referred to as an eighth interface). On the interface 3, in response to a capture operation (or referred to as a second operation) by the user, the mobile phone can capture a video clip that does not exceed the duration 2 (which may be noted as a target clip) from the target video, so that the effect of the template 1 can match the target clip. In other words, the interface 3 is an interface for the mobile phone to cut a target. The mobile phone responds to capturing the target clip, and the mobile phone may use the template 1 to add the video effect to the target clip to form a finished video.

For example, an example in which the duration 2 is 29 s, the target thumbnail is the thumbnail 606 shown in FIG. 6B(1), and in response to the tap operation on the thumbnail 606, the interface 3 displayed is the interface 611 shown in FIG. 6C(1) is used. Because the video duration of the video corresponding to the thumbnail 606, that is, the target video, is 00:35, that is, 35 s, which exceeds the duration 2, in response to the tap operation performed by the user on the button "One tap for video clipping" on the interface 611, the mobile phone can display an interface 612 shown in FIG. 6C(2). On the interface 3, the mobile phone can capture the video clip that does not exceed 29 s, that is, the target clip.

The interface 3 includes a control 4, and the control 4 is configured to trigger the mobile phone to select a video clip that does not exceed the duration 2. For example, the control 4 is a selection box 613 shown in FIG. 6C(2), and the selection box 613 can select a video clip with the duration 2 at the longest. Generally, the control 4 selects a video clip with the duration 2 at the beginning of the video 3 by default. On the interface 3, the mobile phone can receive a slide operation performed by the user on the video clip selected by the control 4, and in response to the slide operation performed by the user on the video clip selected by the control 4, the mobile phone can select a new video clip.

In addition, on the interface 3, the mobile phone can receive a push and pull operation performed by the user on a left or right edge of the control 4, and in response to the push and pull operation performed by the user on the left or right edge of the control 4, the mobile phone can change clip duration of the selected video clip, to select a new video clip. In addition, in response to the push and pull operation performed by the user on the left or right edge of the control 4, if the clip duration exceeds the duration 2 after dragging, the mobile phone can display a prompt information 3 on the interface 3, and the prompt information 3 is used for prompting that a maximum duration is reached. For example, an example in which the duration 2 is 29 s is used, as shown in FIG. 6D(1), in this case, the video clip of 29 s is selected, and based on this, as shown in FIG. 6D(2), in response to that the user pushes the right edge of the selection box toward a direction shown by an arrow, the mobile phone can display a prompt 624 shown in FIG. 6D(3). Specific content of the prompt 624 is "The maximum adjustable duration is reached", to prompt that the maximum duration is reached. In other words, the prompt 624 is a prompt information 3.

Further, the interface 3 may further include a playback progress bar, and a whole duration corresponding to the playback progress bar represents the duration of the selected video clip. For example, the playback progress bar is a progress bar 614 shown in FIG. 6C(2). 00:29 on the right of the progress bar 614 indicates that the clip duration of the video clip is 29 s, and 00:14 on the left indicates that the video is currently played to the 14$^{th}$ second. The playback progress bar can be used for triggering the mobile phone to update a playback progress of the currently selected video clip. In addition, the playback progress bar and the control 4 are independently set, to conveniently and accurately adjust the playback progress.

After selecting a video clip that the user is satisfied with, the mobile phone can receive an operation 4 (that is, the second operation) by the user on the interface 3, and the operation 4 is used for triggering the mobile phone to cut the target video. The operation 4 may be a preset gesture by the user on the interface 3, for example, an upward slide gesture inward from a bottom edge of the interface 3. Alternatively, the interface 3 includes a capture control, for example, a button "V" at an upper right corner of the interface 612 shown in FIG. 6C(2), and the capture control is configured to trigger the mobile phone to capture the video clip. The operation 4 may be a tap operation, a long press operation, and the like by the user on the capture control. A form of the operation 4 is not specifically limited in this embodiment of this application. In response to the operation 4, the mobile phone can capture the target clip, where the target clip is a video clip that is latest selected by the mobile phone and does not exceed the duration 2; and add the video effect to the captured target clip to form a finished video.

In addition, the interface 3 may include a cancel control, for example, a button "x" at an upper left corner of the interface 612 shown in FIG. 6C(2), and the cancel control is configured to trigger the mobile phone to capture a default video clip. For example, a video clip with the duration 2 at the beginning of the target video. In response to the tap operation, long press operation, and the like by the user on the cancel control, the mobile phone can capture the default video clip and add the video effect, to form a finished video.

In this embodiment, for a video with any duration, the "One tap for blockbuster" processing can be performed on. For the target video with video duration that exceeds the duration 2, the target clip with the duration 2 is first captured from the target video, and then the "One tap for video clipping" is performed on the target clip. In this way, the problem that the video duration is excessively long causing a mismatch with the effect in the template 1 can be avoided, to improve the finished video effect.

It should be noted that in this embodiment, for a situation in which the video duration exceeds the duration 2, after responding to that the mobile phone captures the target clip, the mobile phone can use the effect template to process the target clip, instead of using the effect template to process the whole video in response to the operation 3.

In some scenarios, the mobile phone stores a plurality of effect templates, and different effect templates have different effects. An example in which the effect includes background music is used, the background music of the template 1 is dynamic music, and the background music of the template 2 is cheerful music. In some embodiments, in the scenarios in which the mobile phone stores a plurality of pieces of effect music, in response to the operation 3, for example, the tap operation on the button "One tap for video clipping", the mobile phone can select a target template from the plurality of effect templates to process the to-be-processed video (for example, the video 1). The mobile phone can select the target template from the plurality of effect templates randomly or based on a specific rule, for example, based on an order of template numbers.

In addition, for a same to-be-processed video (for example, the video 1), if the mobile phone provides the control 3 for a plurality of times, and receives the operation 3 by the user for a plurality of times, the mobile phone can use different effect templates to process the video, to obtain finished videos with different effects. The video 1 is used as an example. In other words, for the video 1, after displaying the interface 1 for the first time, the mobile phone can receive the operation 3 by the user for the first time. In response to the operation 3 by the user for the first time, the mobile phone can use the template 1 to process the video 1 to form a finished video 1. An effect of the finished video 1 is completely consistent with the effect of the template 1. Subsequently, for the video 1, after the mobile phone displays the interface 1 again, the mobile phone can receive the operation 3 by the user for the second time. In response to the operation 3 by the user for the second time, the mobile phone can use the template 2 to process the video 1 to form a finished video 2. An effect of the finished video 2 is completely the same as the effect of the template 2.

For example, an example in which the interface 1 is an interface 701 shown in FIG. 7A(1) is used, and the interface 701 includes the video 1 and the control 3, for example, a button "One tap for video clipping" 702. After displaying the interface 701 for the first time, in response to a tap operation performed by the user on the button "One tap for video clipping" 702, the mobile phone uses the template 1 to process the video 1, to form the finished video 1. For example, the effect of the finished video 1 is as shown in FIG. 7A(2), and the finished video 1 has a deep gray filter, a sticker "Happy hour", and other effects. After displaying the interface 701 for the second time, in response to the tap operation performed by the user on the button "One tap for video clipping" 702, the mobile phone uses the template 2 to process the video 1, to form the finished video 2. For example, the effect of the finished video 2 is as shown in FIG. 7A(3), and the finished video 2 has a light gray filter, a sticker "Summer mood, we are together in the most beautiful summer", and other effects.

According to this embodiment, for a same video, in response to the operation 3 for a plurality of times, the mobile phone can form finished videos with different effects. This can enhance the diversity of the finished videos.

After selecting the target template (for example, the template 1), in a process of using the target template (for example, the template 1) to process the to-be-processed video, the mobile phone can add effects such as background music, filters, stickers, special effects, and picture frames to the to-be-processed video. In some embodiments, the background music matching each effect template has two versions (which may be noted as a version 1 and a version 2). The version 1 has duration equal to the template duration of the effect template, and the version 2 has fixed duration, for example, 30 s. The fixed duration is longer than the maximum template duration. For example, correspondence between the effect templates and background music are shown in the following Table 2.

TABLE 2

| Effect Template | Template Duration | Background Music | Version 1 | Version 2 |
|---|---|---|---|---|
| Hello summer | 15 s | Relaxing | 15 s | 30 s |
| Beauty | 15 s | Summer | 15 s | 30 s |
| Good mood | 15 s | Dynamic | 15 s | 30 s |
| Little beauty | 15 s | Happy | 15 s | 30 s |
| Parting | 20 s | Sad | 20 s | 30 s |
| Happy winter | 20 s | Winter | 20 s | 30 s |

The template "Hello summer" in Table 2 is used as an example, the matched background music is relaxing music, and because the template duration of the template "Hello summer" is 15 s, the version 1 of the relaxing music is a 15 s version. The template "Happy winter" in Table 2 is used as an example, the matched background music is winter music, and because the template duration of the template "Happy winter" is 20 s, the version 1 of the relaxing music is a 15 s version. In addition, all the versions 2 of the music are versions with fixed duration of 30 s.

In this embodiment, when adding the background music to the to-be-processed video (for example, the video 1), the mobile phone can match the version of the background music for adding based on the video duration of the to-be-processed video. If the video duration of the to-be-processed video is shorter than or equal to the template duration of the target template, the mobile phone can add the version 1 of the background music matching the target template as the background music of the to-be-processed video. For example, an example in which the target template is the template "Hello summer" in Table 2 is used. Assuming that the video duration of the video 1 is 14 s, shorter than the template duration 15 s of the template "Hello summer", the relaxing music of the version of 15 s can be added as the background music of the video 1. If the video duration of the to-be-processed video is longer than the template duration of the target template, and is shorter than or equal to the fixed duration, the mobile phone can add the version 2 of the background music matching the target template as the background music of the to-be-processed video. For example, an example in which the target template is the template "Hello summer" in Table 2 is used. Assuming that the video duration of the video 1 is 28 s, longer than the template duration 15 s of the template "Hello summer" and shorter than the fixed duration 30 s, the relaxing music of the 30 s version can be added as the background music of the video 1. Therefore, the added background music can cover the whole video, to improve the effect of the finished video.

It should be noted that in the embodiment proposed for the problem caused by the excessively long video duration, for the video whose video duration exceeds the duration 2, the mobile phone may not provide the control 3; or the mobile phone can provide the control 3, but needs to cut first, and then can select the effect template for processing only after cutting. Therefore, the fixed duration may be set equal to the duration 2, so that the background music of the version 2 can cover all the to-be-processed video, for example, a target clip that does not exceed the duration 2 and that is obtained after cutting.

Further, in a scenario, the set of effects of the target template does not include a tail leader. Correspondingly, the finally formed finished video does not include the tail leader, and the duration of the finished video is the video duration. Refer to (a) in FIG. 7B, in this scenario, if the music duration of the added background music is longer than the video duration, the mobile phone can align the beginning of the background music with the beginning of the to-be-processed video, and delete a part of the end of the background music that exceeds shooting duration, that is, delete background music corresponding to redundant duration 1 in (a) in FIG. 7B, to obtain effective music. A fade-out effect is added at the end of the effective music, so that the end of the background music in the finished video is more smooth. In another scenario, the set of effect of the target template includes the tail leader. Correspondingly, the finally formed finished video includes the tail leader, and the duration of the finished video is equal to a sum of the video duration and tail leader duration. Refer to (a) in FIG. 7B. In this scenario, if the music duration of the added background music is longer than the sum of the video duration and the tail leader duration, the mobile phone can align the beginning of the background music with the beginning of the to-be-processed video, and delete a part of the end of the background music that exceeds the tail leader duration, that is, delete background music corresponding to redundant duration 2 in (b) in FIG. 7B, to obtain effective music. A fade-out effect is added at the end of the effective music, so that the end of the background music in the finished video is more smooth.

Figure 8A:
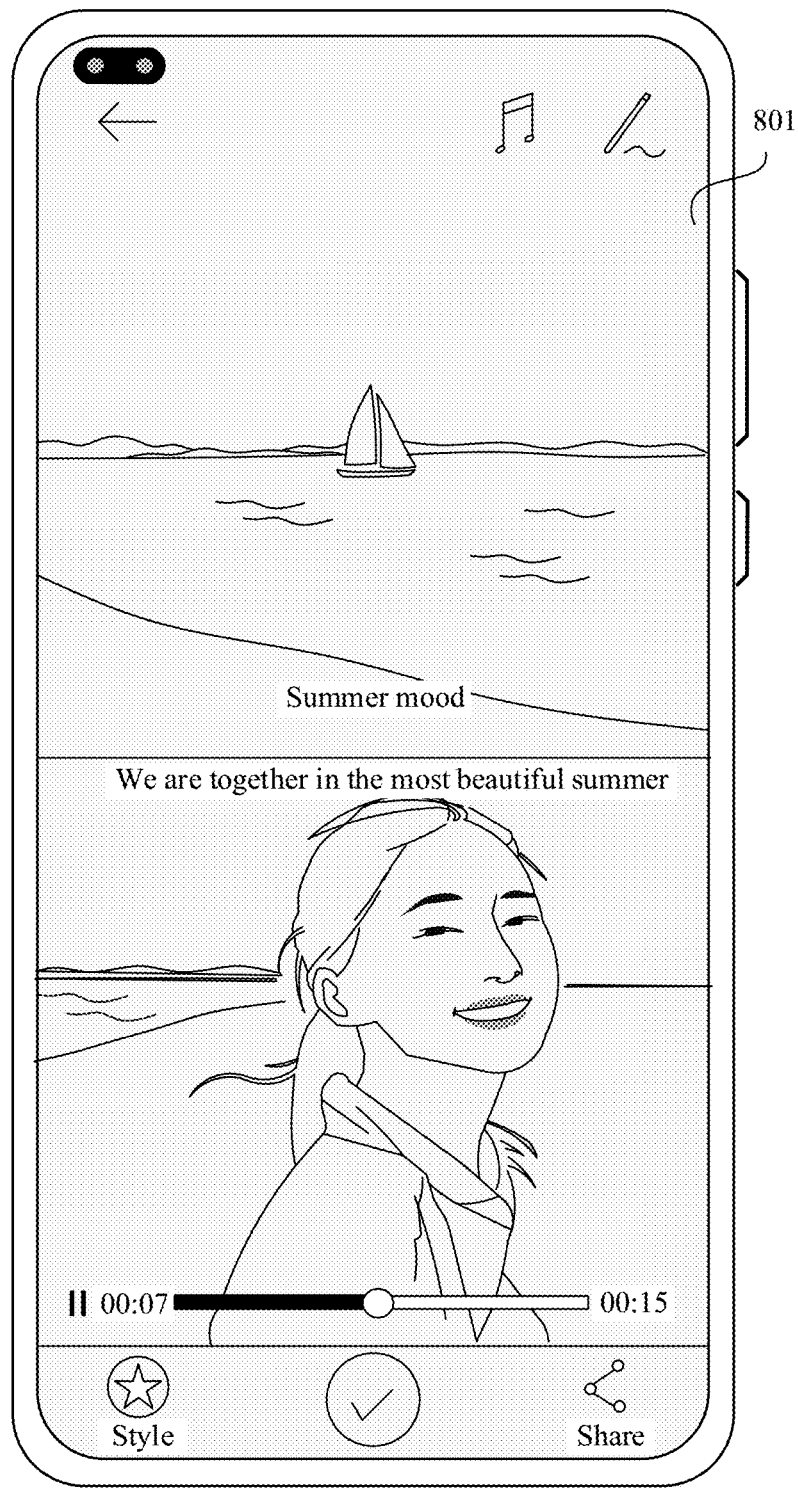
FIG. 8A and FIG. 8B are a schematic diagram 10 of an interface of a mobile phone according to an embodiment of this application.

After forming the finished video, the mobile phone can display an interface 5, and the interface 5 is a preview interface of the finished video. On the interface 5, the finished video can be played. Therefore, the finished video effect can be presented to the user. For example, the interface 5 is an interface 801 shown in FIG. 8A. The interface 801 is playing the finished video, and the finished video has the light gray filter, the sticker "Summer mood, we are together in the most beautiful summer", and other effects.

Figure 8B:
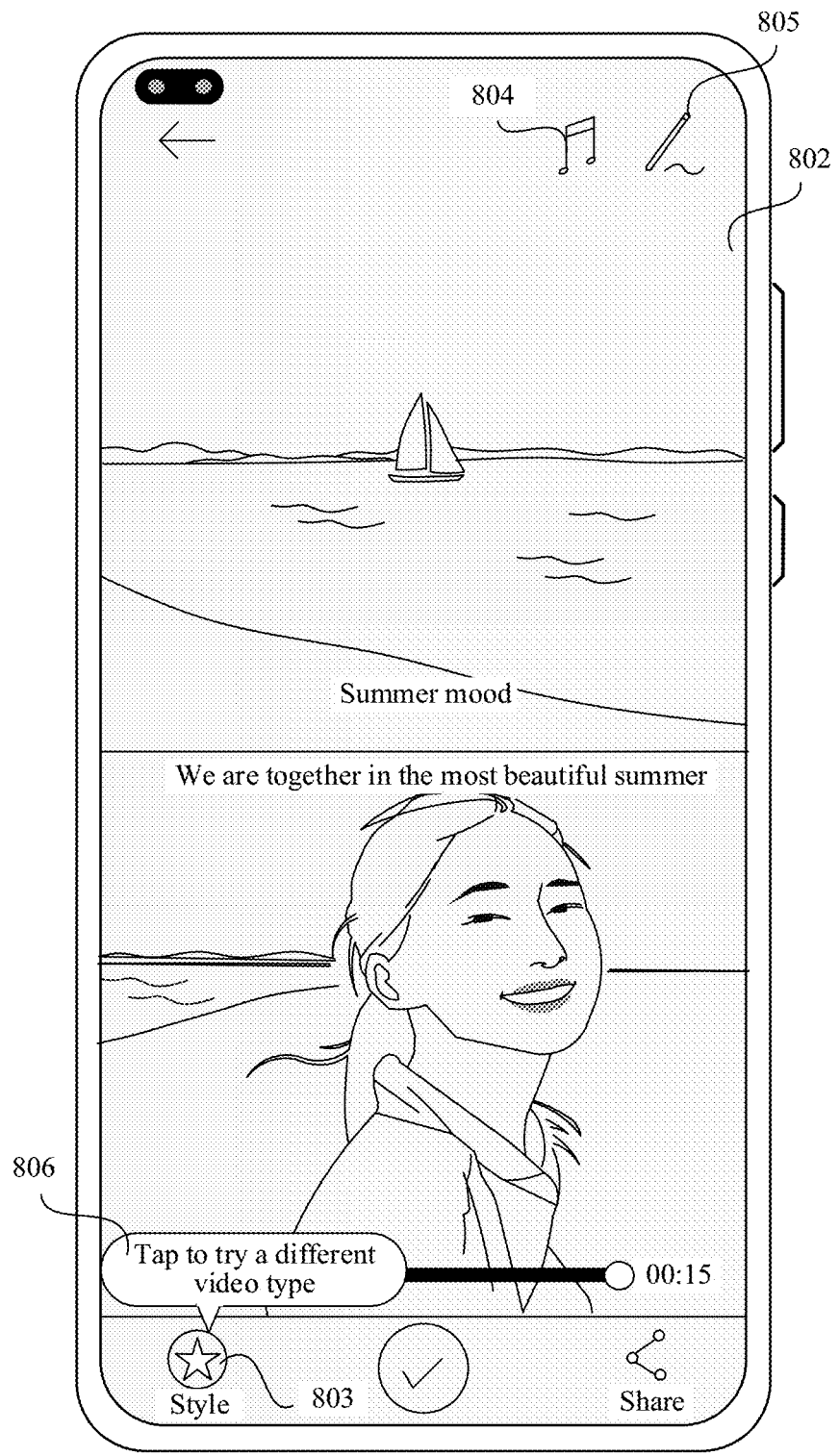

In some embodiments, after displaying the interface 5, if preset condition is satisfied, the mobile phone can display a prompt information 4 (or referred to as the second prompt information) on the interface 5, as a prompt 806 "Tap to try different movie styles" on an interface 802 shown in FIG. 8B. The prompt information 4 is used for prompting adjusting the effect of the finished video, that is, adjusting the added video effects. That the preset condition is satisfied includes: Display duration of the interface 5 reaches duration 3, for example, 10 s, and no preset operation performed by the user is detected. Alternatively, the interface 5 may play the finished video. After the interface is displayed, the finished video is played. Correspondingly, that the preset condition is satisfied includes: Playback of the finished video on the interface 5 is finished, and no preset operation performed by the user is detected. The preset operation is used for triggering the mobile phone to adjust the effect of the finished video.

For example, the interface 5 includes an effect switch control (or referred to as a second control), and the effect switch control is configured to trigger the mobile phone to adjust the effect of the finished video. For example, the effect switch control may include a style switch control, as a button "Style" 803 on the interface 802 shown in FIG. 8B. The style switch control is configured to trigger the mobile phone to switch a style of the finished video. The style means an overall effect other than the background music, for example, the overall effect of a plurality of effects such as the filter, the sticker, and the picture frame. For another example, the effect switch control may include a music switch control, as a music button 804 on the interface 802 shown in FIG. 8B, and the music switch control is configured to trigger the mobile phone to switch the background music of the finished video. For still another example, the effect switch control may include an editing control, as an editing button 805 on the interface 802 shown in FIG. 8B, and the editing control is configured to trigger the mobile phone to switch effects of the finished video, such as the background music, the filter, the sticker, the picture frame, the transition, volume, and the tail leader. The preset operation may be a tap operation or long press operation performed by the user on the effect switch control (or referred to as a third operation).

Further, that no preset operation performed by the user is detected means: From the mobile phone is used for the first time, after using the "One tap for video clipping" and entering the interface 5, it is never detected that the user inputs a preset operation. For example, in a historical process of using mobile phone, after using the "One tap for video clipping" and forming the finished video, the user has tapped the style switch control on the interface 5. When the interface 5 is displayed this time, the prompt information 4 is not displayed after the playback of the finished video is finished. In this way, repeated prompts to the user who is already familiar with the function of effect switch can be avoided.

Figure 9A:
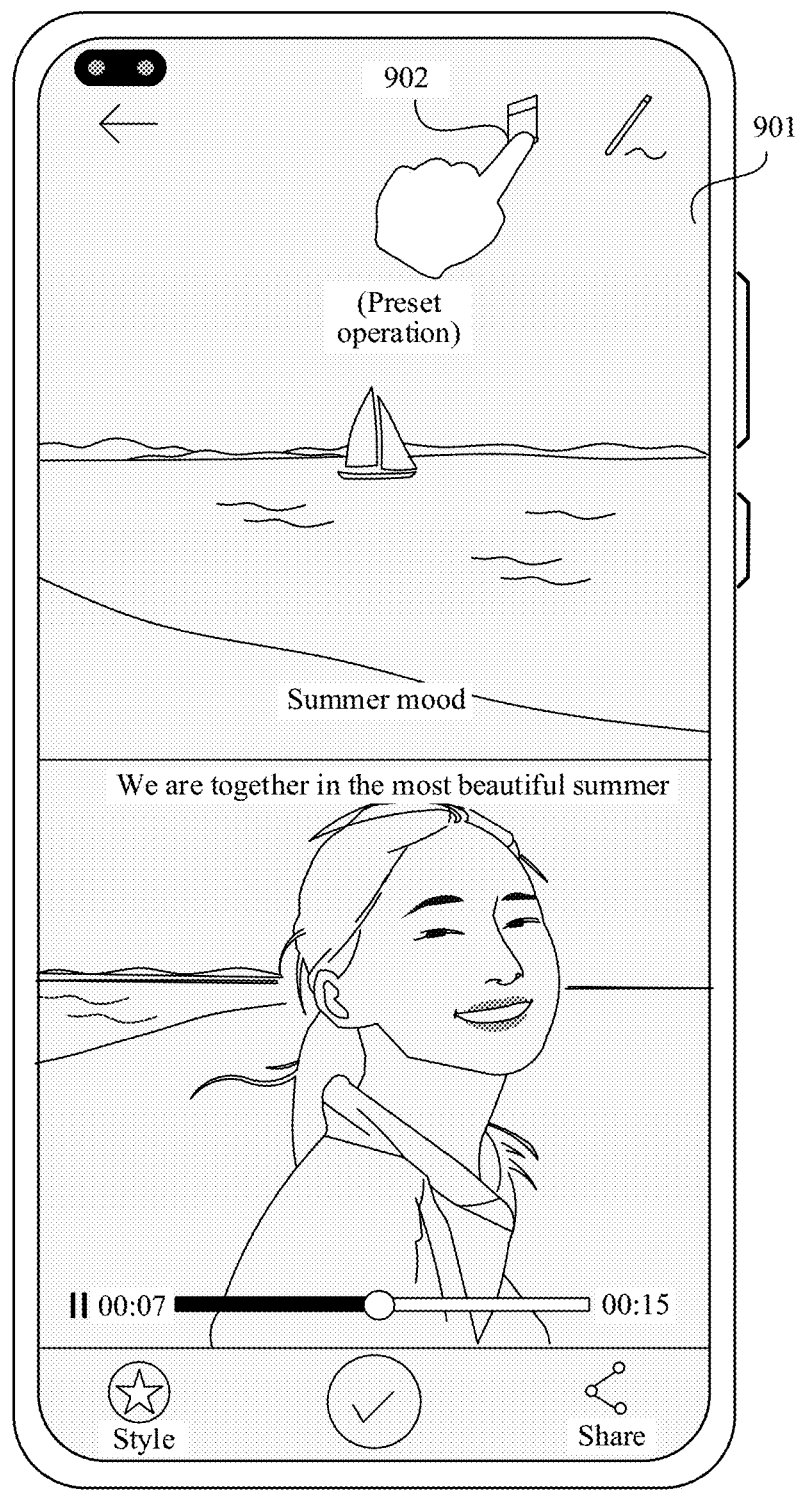
FIG. 9A, FIG. 9B, FIG. 9C, and FIG. 9D are a schematic diagram 11 of an interface of a mobile phone according to an embodiment of this application.
Figure 9B:
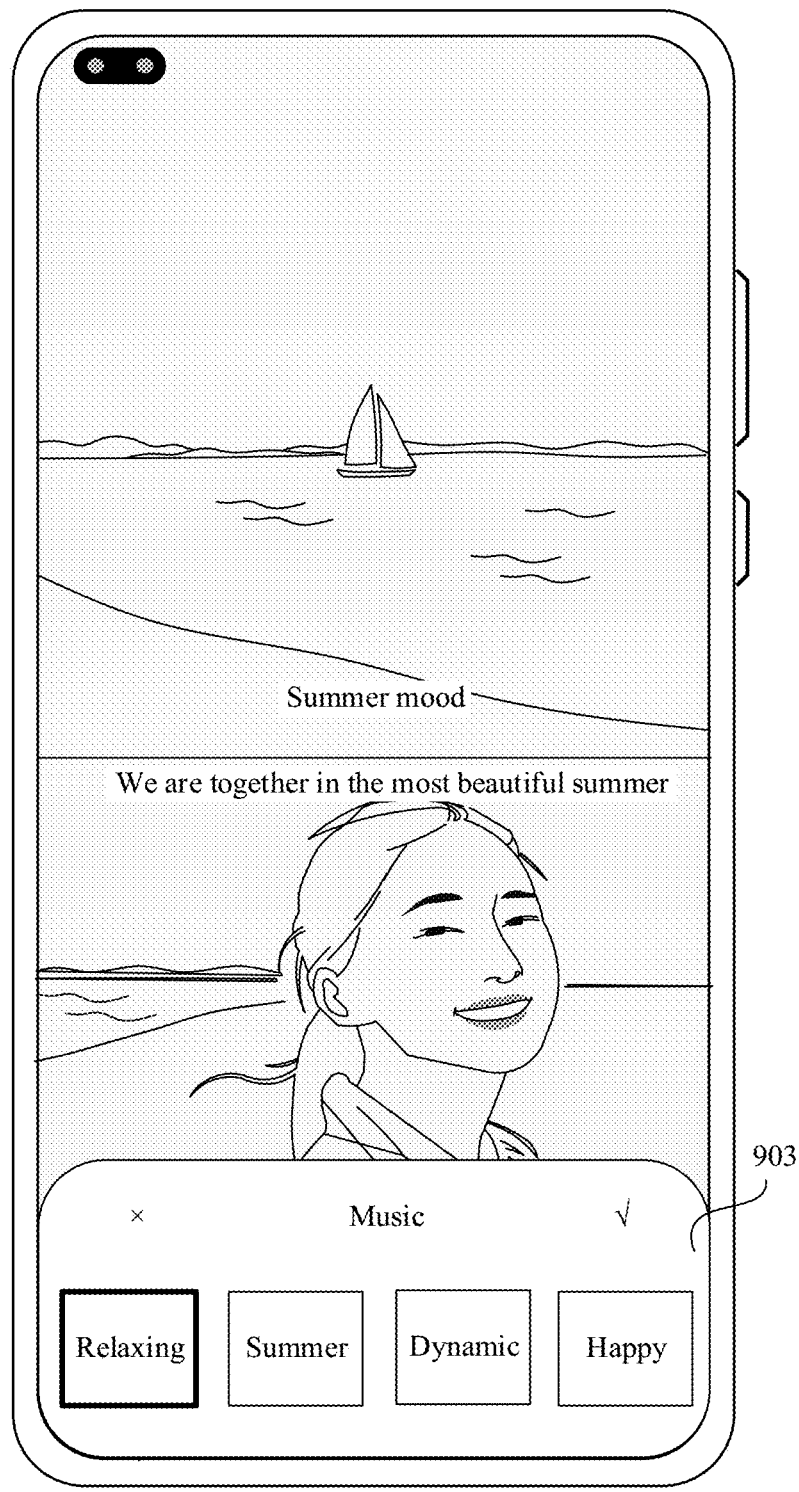

In some embodiments, after displaying the interface 5, the mobile phone can receive the preset operation performed by the user, and the preset operation is used for adjusting the effect of the finished video. For the preset operation, refer to the descriptions in the foregoing embodiments, and details are not described herein again. Switching the background music is used as an example, the preset operation may be a tap operation performed by the user on a music button 902 on an interface 901 shown in FIG. 9A. In response to the preset operation, the mobile phone can display a plurality of effect options on the interface 5. For example, the plurality of effect options are four music options "Relaxing", "Summer", "Dynamic", and "Happy" in a pop-up window 903 shown in FIG. 9B, and each music option corresponds to a piece of background music.

It should be noted that, in the foregoing descriptions of the music options, to distinguish the music and the effect templates, covers and names of the music options have no association with the corresponding effect templates. In some other embodiments, to reflect association between the music and the effect templates, when the plurality of music options are displayed, the covers of the music options may be set to template covers of the effect templates that match the corresponding music. Alternatively, the names of the music options can be set to template names of the effect templates that match the corresponding music.

In some embodiments, an option corresponding to the background music of the currently used effect template can be displayed as the first of the plurality of music options, thereby facilitating quick recovery to an original background music. In addition, the first music option can be selected by default. For example, an example in which the background music currently used in the finished video is the relaxing music is used, the mobile phone can display the pop-up window 903 shown in FIG. 9B. In the pop-up window 903, the option of the relaxing music is displayed in bold, indicating that the option is selected by default.

Figure 9C:
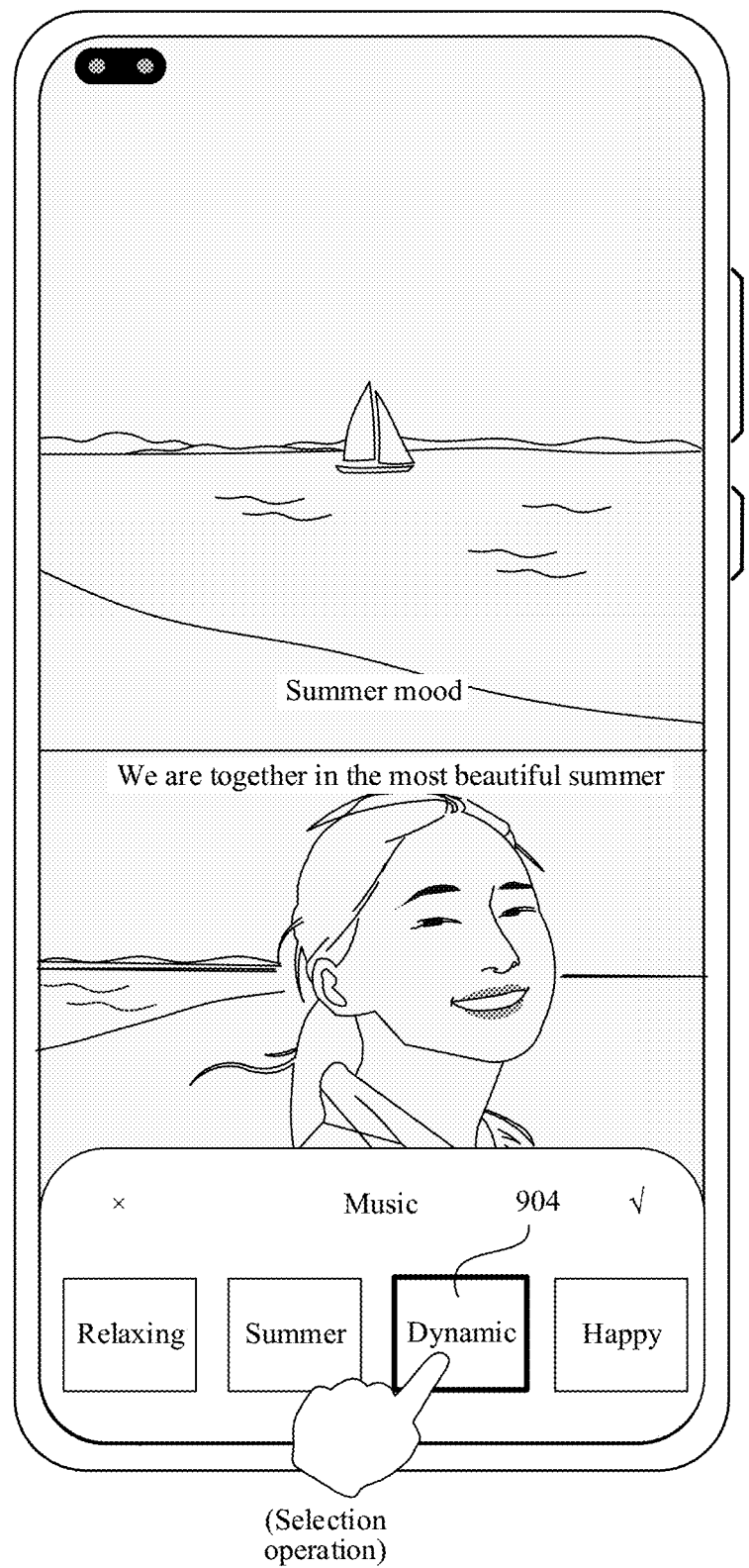
Figure 9D:
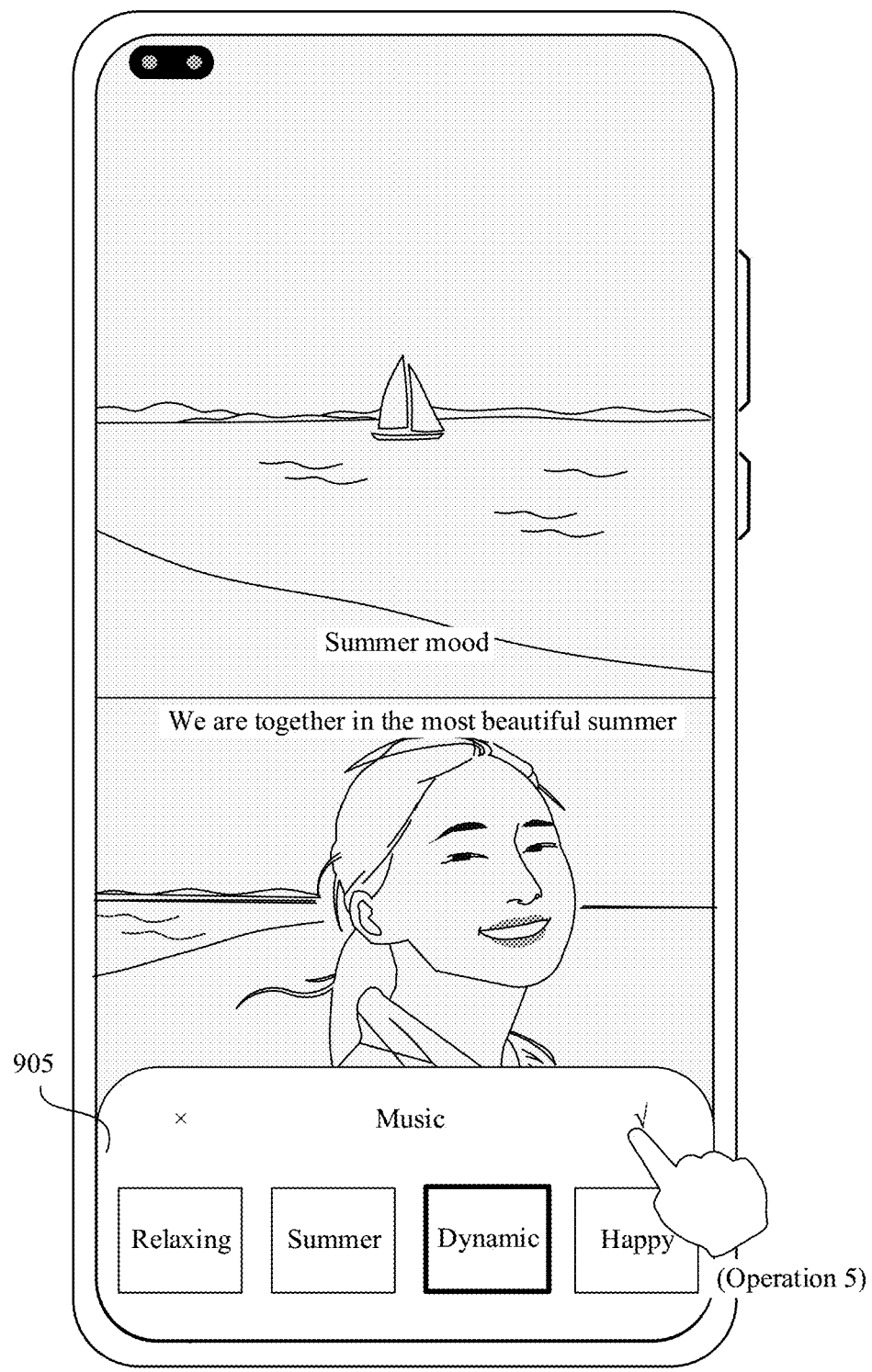

After displaying a plurality of music options, the mobile phone can receive a selection operation performed by the user on any music option (which may be noted as a music option 1). In response to the selection operation on the music option 1, the mobile phone can replace the background music in the finished video with the background music corresponding to the option 1, and play the finished video from the beginning. For example, an example in which the music option 1 is an option 904 shown in FIG. 9C is used, in response to the selection operation performed by the user on the option 904, the mobile phone can replace the background music in the finished video with music corresponding to the option 904, and play the finished video from the beginning. In this way, it is convenient to preview an effect of applying the selected music to the finished video. Subsequently, the mobile phone can receive an operation 5 by the user, and the operation 5 is used for triggering the mobile phone to switch the background music. The operation 5 may be a downward slide operation from top to bottom from the pop-up window displaying the plurality of music options (which may be noted as a music pop-up window). Alternatively, the music pop-up window includes a confirm control, and the operation 5 may be a tap operation or a long press operation performed by the user on the confirm control. For example, the music pop-up window is a pop-up window 905 shown in FIG. 9D, and the pop-up window 905 includes the button "V". The button "V" is the confirm control. The operation 5 may be a tap operation performed by the user on the button "V". A form of the operation 5 is not specifically limited in this embodiment of this application. In response to the operation 5, the mobile phone can turn off the plurality of music options, and restore to displaying the interface 5 without the music options. For example, the interface 901 shown in FIG. 9A may be displayed.

In the foregoing embodiment, in response to the preset operation, the mobile phone can adjust at least one effect of an added set of video effects (for example, the video effects of the template 1), thereby breaking a fixed combination of the effects such as the background music, the filter, the picture frame, and the sticker in the effect template (for example, the template 1) selected in the "One tap for video clipping". For example, after switching the effects such as the background music, the filter, the picture frame, and the sticker of the template 1 may be combined with the background music after switching. This can enhance the diversity of the finished video effects.

Figure 10A:
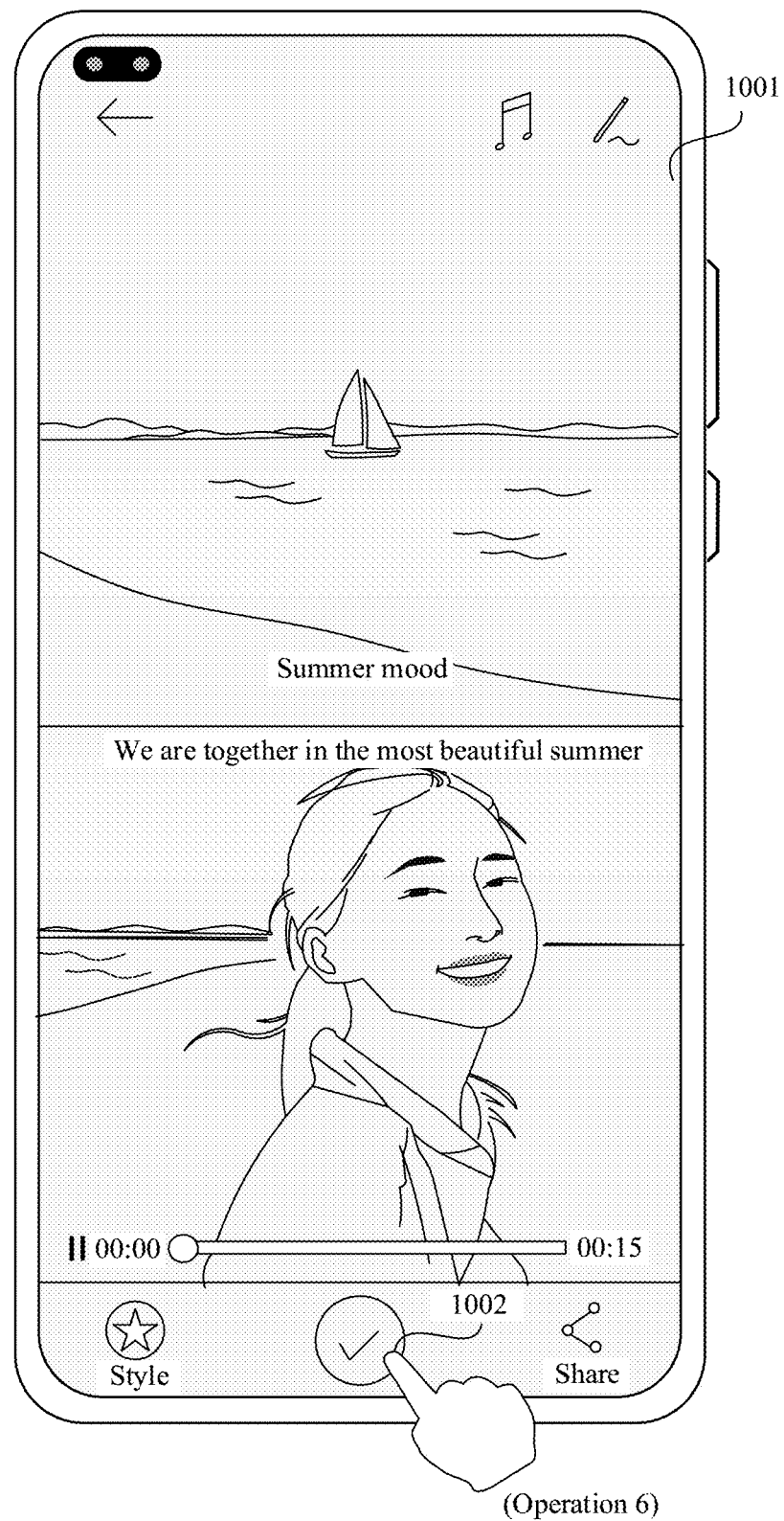
FIG. 10A, FIG. 10B, FIG. 10C, and FIG. 10D are a schematic diagram 12 of an interface of a mobile phone according to an embodiment of this application.
Figure 10B:
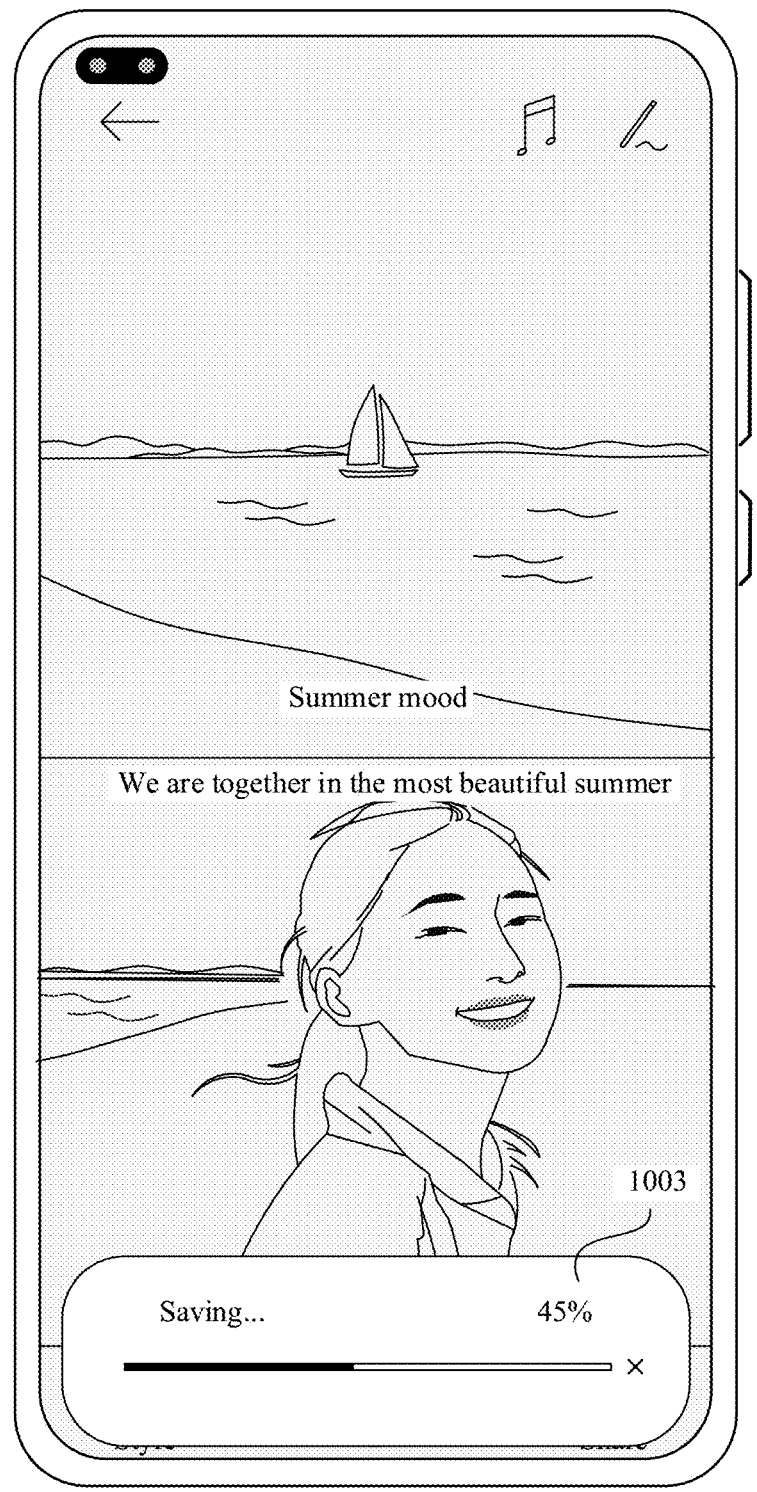

In addition, after displaying the interface 5, the mobile phone can receive an operation 6 (or referred to as a fourth operation) by the user, and the operation 6 is used for triggering the mobile phone to save the finished video. The operation 6 may be a leftward slide operation performed by the user inward from a right edge of the interface 5. Alternatively, the interface 5 includes a control 5, for example, a button "V" 1002 on an interface 1001 shown in FIG. 10A, and the control 5 is configured to trigger the mobile phone to save the finished video. The operation 6 may be a tap operation, a long press operation, or the like by the user on the control 5. A form of the operation 6 is not specifically limited in this embodiment of this application. In response to the operation 6, the mobile phone can save the finished video, and display a saving prompt on the interface 5. For example, the saving prompt is a prompt 1003 shown in FIG. 10B. The prompt 1003 prompts that a saving progress is 45%, and when saving is finished, the progress is 100%.

Figure 10C:
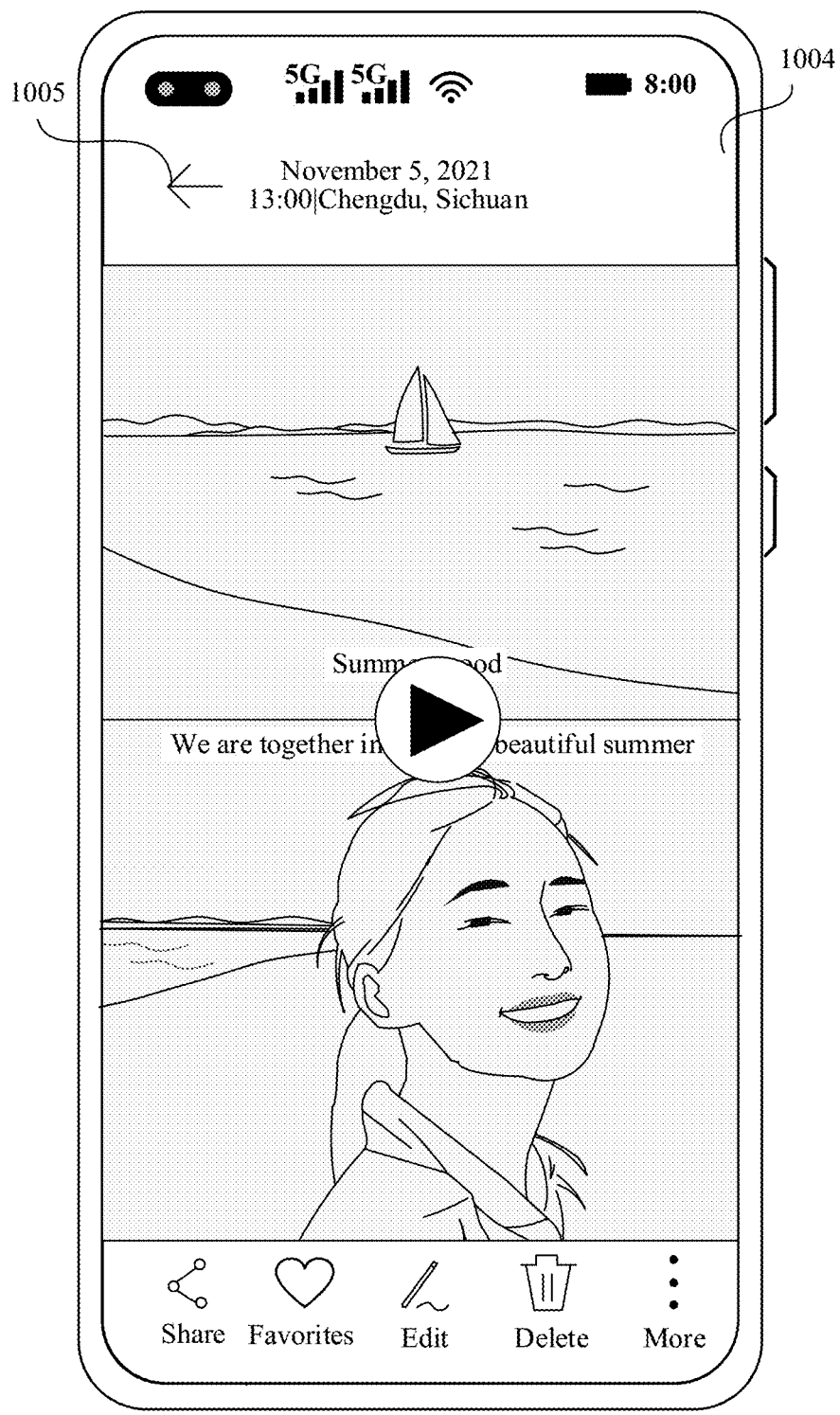

Then, in response to that the saving is finished, the mobile phone can display an interface 6 (or referred to as a ninth interface). The interface 6 is an editing interface of the finished video. A difference between the interface 6 and the interface 1 lies in: The interface 6 includes the finished video of the to-be-processed video on the interface 1, and the interface 6 does not include the control 3, for example, the button "One tap for video clipping". For example, the interface 6 may be an interface 1004 shown in FIG. 10C. Compared with the interface 316 (that is, the interface 1) shown in FIG. 3B(3), the video on the interface 1004 has effects of a filter, a sticker, and the like, and is the finished video of the video on the interface 316; and the interface 1004 does not include the control 3, for example, the button "One tap for video clipping".

It should be noted that in some embodiments, in response to the operation 6, the mobile phone may not display the saving prompt, and directly jump to the interface 6. This is not specifically limited in this embodiment of this application.

The foregoing descriptions of the finished video is focused on previewing and then saving, and in other embodiments, the mobile phone may alternatively directly save the video after the video is finished without displaying a preview.

Figure 10D:
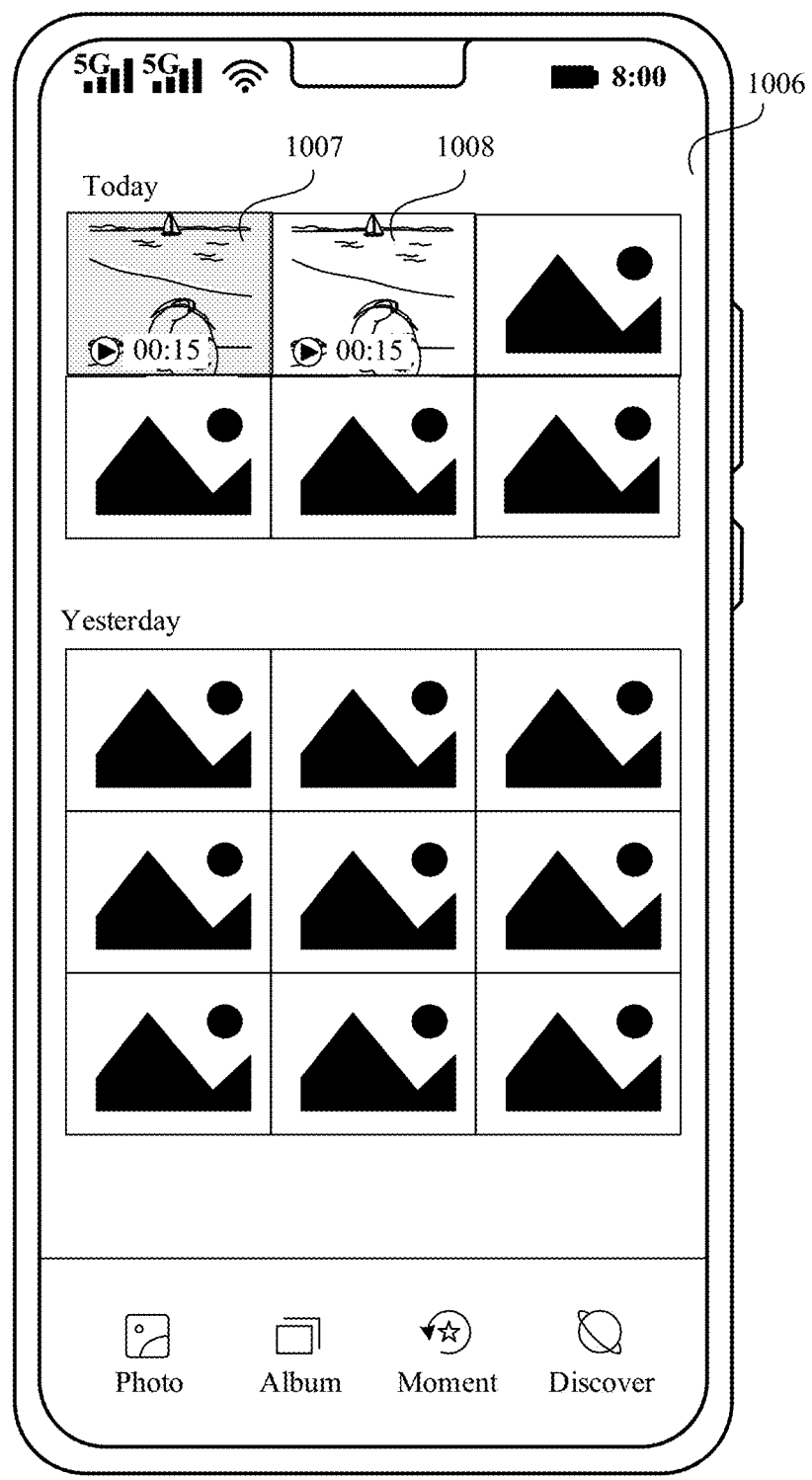

In some embodiments, the mobile phone can receive an operation 7 (or referred to as a return operation) by the user on the interface 6, and the operation 7 is used for triggering the mobile phone to return to the application interface of the gallery application. The operation 7 may be a rightward slide operation performed by the user inward from a left edge of the interface 6. Alternatively, the interface 6 includes a return control, for example, a button 1005 shown in FIG. 10C. The operation 7 may be a tap operation performed by the user on the return control. A form of the operation 7 is not specifically limited in this embodiment of this application. In response to the operation 7, the mobile phone can display the interface 7 (or referred to as a third interface), and the interface 7 is the application interface of the gallery application. In this case, a thumbnail of a frame of image in the finished video generated this time is added to the application interface of the gallery application (or referred to as a second option). For example, in response to the operation 7, the mobile phone can display an interface 1006 shown in FIG. 10D, and the interface 1006 includes a thumbnail 1007. The thumbnail 1007 is a thumbnail of a finished video that is latest saved.

Based on the foregoing descriptions, it can be learned that for the same to-be-processed video (for example, the video 1), if the mobile phone provides the control 3 for a plurality of times, and receives the operation 3 by the user for a plurality of times, the mobile phone can use different effect templates to process the video, to obtain finished videos with different effects. Therefore, in some embodiments, after displaying the interface 7, the mobile phone can receive a tap operation performed by the user on the thumbnail of the video 1 (that is, the first option), for example, a thumbnail 1008 on the interface 1006 shown in FIG. 10D, and in response to the tap operation performed by the user on the thumbnail of the video 1 (that is, the first option), the mobile phone can display an interface 8 (or referred to as a fourth interface). The interface 8 is an editing interface of the video 1, and the interface 8 provides the control 3. Then the mobile phone can receive the operation 3 by the user on the interface 8, for example, the tap operation on the control 3. In response to the operation 3, the mobile phone can add a video effect to the video 1 based on a different effect template (for example, the template 2), to generate a new finished video (or referred to as a second finished video). For ease of description, the video effect of the template 2 may be referred to as a second video effect. The second video effect is different from the first video effect. It should be noted that, that the second video effect is different from the first video effect means: at least one of the second video effect is different from that of the first video effect, for example, at least one of the effects such as the background music, the filter, the sticker, the picture frame, and the transition is different. In this way, for a same video, the "One tap for video clipping" is performed for a plurality times consecutively, and finished videos with different effects can be generated.

Based on the foregoing descriptions, it can be learned that for the video to which the mobile phone adds the video effect (for example, the video 2), the mobile phone may not provide the control 3. In addition, the interface 7 includes the thumbnail of the finished video generated this time (that is, the second option). Therefore, in some embodiments, after displaying the interface 7, the mobile phone can receive the tap operation performed by the user on the thumbnail of the finished video generated this time. In response to the tap operation performed by the user on the thumbnail of the finished video generated this time, the mobile phone can display an interface 9. The interface 9 is an editing interface of the finished video generated this time. Because the finished video generated this time is noted as a video to which the video effect is added, the interface 9 does not include the control 3. This can avoid disorderly video effects caused by further adding a video effect to the generated finished video.

Some other embodiments of this application provide an electronic device. The electronic device may include: the foregoing display screen (for example, a touch screen), a memory, and one or more processors. The display screen, the memory, and the processor are coupled. The memory is configured to store computer program code. The computer program code includes computer instructions. When the processor executes the computer instructions, the electronic device can perform the functions or the steps performed by the mobile phone in the foregoing method embodiments. For a structure of the electronic device, refer to the structure of the mobile phone shown in FIG. 1.

Figure 11:
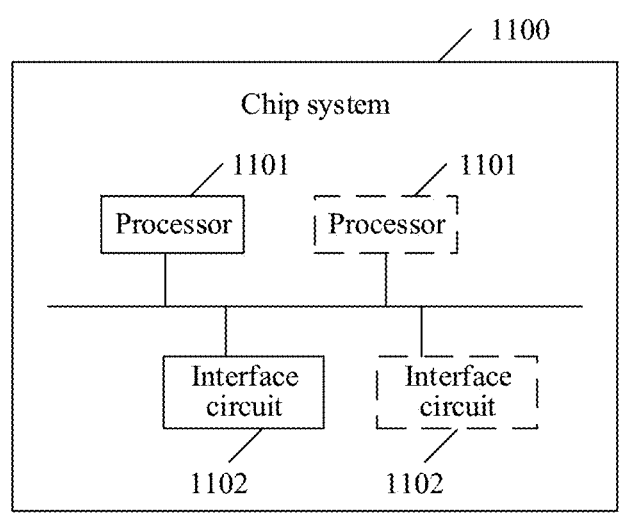
FIG. 11 is a schematic diagram of a structure of a chip system according to an embodiment of this application.

An embodiment of this application further provides a chip system. As shown in FIG. 11, a chip system 1100 includes at least one processor 1101 and at least one interface circuit 1102. The processor 1101 and the interface circuit 1102 may be connected to each other through a line. For example, the interface circuit 1102 may be configured to receive a signal from another apparatus (for example, the memory of the electronic device). For another example, the interface circuit 1102 may be configured to transmit a signal to another apparatus (for example, the processor 1101). For example, the interface circuit 1102 may read instructions stored in the memory and transmit the instructions to the processor 1101. When the instructions are executed by the processor 1101, the electronic device may be enabled to perform the steps in the foregoing embodiments. Certainly, the chip system may further include other discrete devices, which is not specifically limited in this embodiment of this application.

An embodiment of this application further provides a computer storage medium. The computer storage medium includes computer instructions, and when the computer instructions are run on the electronic device, the electronic device is enabled to perform the functions or the steps performed by the mobile phone in the foregoing method embodiments.

An embodiment of this application further provides a computer program product. When the computer program product is run on a computer, the computer is enabled to perform the functions or the steps performed by the mobile phone in the foregoing method embodiments.

Based on the descriptions of the foregoing implementations, a person skilled in the art may clearly understand that, for a purpose of convenient and brief description, division into the foregoing functional modules is merely used as an example for illustration. In actual application, the foregoing functions may be allocated to different functional modules and implemented based on a requirement. In other words, an inner structure of the apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separated. A part shown as a unit may be one or more physical units, and may be located at one position, or may be distributed at different positions. Some or all of the units may be selected based on an actual requirement to achieve the objectives of the solutions in embodiments.

In addition, the functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of the software functional unit and sold or used as an independent product, the integrated unit may be stored in a readable storage medium. Based on such an understanding, the technical solutions of embodiments of this application essentially, or the part contributing to the related art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The storage medium includes: any medium that can store program code, such as a USB flash drive, a mobile hard disk, a read only memory (read only memory, ROM), a random access memory (random access memory, RAM), a magnetic disk, an optical disc, or the like.

The foregoing content is merely specific embodiments of this application, but is not intended to limit the protection scope of this application. Any variation or replacement within the technical scope disclosed in this application shall fall within the protection scope of this application. Therefore, the protection scope of this application should be subject to the protection scope of the claims.

What is claimed is:

1. A video processing method, applied to an electronic device and comprising:
    displaying, by the electronic device, a first interface, wherein the first interface comprises a first option, and the first option displays a thumbnail of a frame of image in a first video;
    displaying, by the electronic device in response to a tap operation performed by a user on the first option on the first interface, a second interface, wherein the second interface is an editing interface of the first video, and the second interface further comprises a first control;
    generating, by the electronic device in response to a first operation performed by the user on the first control on the second interface, a first finished video, wherein the first finished video is a video obtained by the electronic device by adding a first video effect to the first video;
    displaying, by the electronic device, a third interface, wherein the third interface comprises a second option and the first option, and the second option displays a thumbnail of a frame of image in the first finished video;
    displaying, by the electronic device in response to a tap operation performed by the user on the first option on the third interface, a fourth interface, wherein the fourth interface is an editing interface of the first video, and the fourth interface further comprises the first control; and generating, by the electronic device in response to the first operation performed by the user on the first control on the fourth interface, a second finished video, wherein the second finished video is a video obtained by the electronic device by adding a second video effect to the first video, wherein the first video effect is different from the second video effect.

2. The method according to claim 1, wherein the first interface is an interface before recording a video or taking a picture in a camera application of the electronic device, or the first interface is an application interface of a gallery application in the electronic device; and the third interface is an application interface of the gallery application.

3. The method according to claim 2, wherein the displaying, by the electronic device in response to a tap operation performed by a user on the first option on the first interface, a second interface comprises:

displaying, by the electronic device in response to the tap operation performed by the user on the first option on the first interface, the second interface if the first video is a video to which no video effect is added.

4. The method according to claim 3, wherein the method further comprises:

displaying, by the electronic device in response to the tap operation performed by the user on the first option on the first interface, a fifth interface if the first video is a video to which a video effect is added, wherein the fifth interface is an editing interface of the first video, and the fifth interface does not comprise the first control.

5. The method according to claim 4, wherein after the displaying, by the electronic device, a third interface, the method further comprises:

displaying, by the electronic device in response to a tap operation performed by the user on the second option, a sixth interface, wherein the sixth interface is an editing interface of the first finished video, and the sixth interface does not comprise the first control.

6. The method according to claim 5, wherein the displaying, by the electronic device in response to a tap operation performed by a user on the first option on the first interface, a second interface comprises:

displaying, by the electronic device in response to the tap operation performed by the user on the first option on the first interface, the second interface if video duration of the first video exceeds first duration, and the video duration of the first video does not exceed second duration, wherein the first duration is less than the second duration.

7. The method according to claim 6, wherein the method further comprises:

displaying, by the electronic device, a first prompt information at the same time when the electronic device displays the first control for the first time, wherein the first prompt information is used for prompting video duration applicable to a function of adding a video effect.

8. The method according to claim 7, wherein the method further comprises:

displaying, by the electronic device in response to the tap operation performed by the user on the first option on the first interface, a seventh interface if the video duration of the first video does not exceed the first duration, or the video duration of the first video exceeds the second duration, wherein the seventh interface is an editing interface of the first video, and the seventh interface does not comprise the first control.

9. The method according to claim 5, wherein the video duration of the first video exceeds the second duration, wherein the generating, by the electronic device in response to a first operation performed by the user on the first control on the second interface, a first finished video comprises:

displaying, by the electronic device in response to the first operation performed by the user on the first control on the second interface, an eighth interface, wherein the eighth interface is an interface that the electronic device cuts the first video; and generating, by the electronic device in response to a second operation performed by the user on the eighth interface, the first finished video, wherein the first finished video is a video obtained by the electronic device by adding the first video effect to a target clip, the target clip belongs to the first video, and clip duration of the target clip does not exceed the second duration.

10. The method according to claim 9, wherein after the generating the first finished video, the method further comprises:

displaying, by the electronic device, a preview interface of the first finished video.

11. The method according to claim 10, wherein the preview interface comprises a second control, and the second control is configured to trigger the electronic device to edit a finished video, wherein after the displaying, by the electronic device, a preview interface of the first finished video, the method further comprises:

playing, by the electronic device, the first finished video on the preview interface; and displaying, by the electronic device in response to completion of playback of the first finished video, second prompt information on the preview interface when the electronic device does not detect a third operation performed by the user on the second control, wherein the second prompt information is used for prompting the electronic device to edit the first finished video.

12. The method according to claim 11, wherein the fifth interface comprises a second control, and the second control is configured to trigger the electronic device to edit a finished video, wherein after the displaying, by the electronic device, a preview interface of the first finished video, the method further comprises:

switching, by the electronic device in response to the third operation performed by the user on the second control, at least one effect of the first video effect, wherein the at least one effect comprises one or more of background music, a filter, a sticker, a picture frame, a transition, and a tail leader.

13. The method according to claim 12, wherein after the electronic device displays the preview interface of the first finished video, the method further comprises:

saving, by the electronic device in response to a fourth operation performed by the user on the preview interface, the first finished video; and displaying, by the electronic device in response to completion of saving the first finished video, a ninth interface, wherein the ninth interface is an editing interface of the first finished video, and the ninth interface does not comprise the first control, wherein the displaying, by the electronic device, a third interface comprises:
displaying, by the electronic device in response to a return operation input by the user on the ninth interface, the third interface.

14. An electronic device, wherein a plurality of applications are installed in the electronic device, and the electronic device comprises a display screen, a memory, and one or more processors, wherein the display screen, the memory, and the processor are coupled; and the memory is configured to store computer program code, the computer program code comprises computer instructions, and when the computer instructions are executed by the processor, the electronic device is enabled to perform the following operations:
displaying, by the electronic device, a first interface, wherein the first interface comprises a first option, and the first option displays a thumbnail of a frame of image in a first video;
displaying, by the electronic device in response to a tap operation performed by a user on the first option on the first interface, a second interface, wherein the second interface is an editing interface of the first video, and the second interface further comprises a first control;
generating, by the electronic device in response to a first operation performed by the user on the first control on the second interface, a first finished video, wherein the first finished video is a video obtained by the electronic device by adding a first video effect to the first video;
displaying, by the electronic device, a third interface, wherein the third interface comprises a second option and the first option, and the second option displays a thumbnail of a frame of image in the first finished video;
displaying, by the electronic device in response to a tap operation performed by the user on the first option on the third interface, a fourth interface, wherein the fourth interface is an editing interface of the first video, and the fourth interface further comprises the first control; and
generating, by the electronic device in response to the first operation performed by the user on the first control on the fourth interface, a second finished video, wherein the second finished video is a video obtained by the electronic device by adding a second video effect to the first video, wherein
the first video effect is different from the second video effect.

15. The electronic device of claim 14, wherein the first interface is an interface before recording a video or taking a picture in a camera application of the electronic device, or the first interface is an application interface of a gallery application in the electronic device; and
the third interface is an application interface of the gallery application.

16. The electronic device of claim 15, wherein the electronic device further performs the following operations:
displaying, by the electronic device in response to the tap operation performed by the user on the first option on the first interface, the second interface if the first video is a video to which no video effect is added.

17. The electronic device of claim 16, wherein the electronic device further performs the following operations:
displaying, by the electronic device in response to the tap operation performed by the user on the first option on the first interface, a fifth interface if the first video is a video to which a video effect is added, wherein the fifth interface is an editing interface of the first video, and the fifth interface does not comprise the first control.

18. The electronic device of claim 17, wherein the electronic device further performs the following operations:
displaying, by the electronic device in response to a tap operation performed by the user on the second option, a sixth interface, wherein the sixth interface is an editing interface of the first finished video, and the sixth interface does not comprise the first control.

19. The electronic device of claim 18, wherein the electronic device further performs the following operations:
displaying, by the electronic device in response to the tap operation performed by the user on the first option on the first interface, the second interface if video duration of the first video exceeds first duration, and the video duration of the first video does not exceed second duration, wherein the first duration is less than the second duration.

20. A non-transitory computer-readable storage medium, wherein the computer-readable storage medium stores instructions, wherein when the instructions are run on an electronic device, the electronic device is enabled to perform the following operations:
displaying, by the electronic device, a first interface, wherein the first interface comprises a first option, and the first option displays a thumbnail of a frame of image in a first video;
displaying, by the electronic device in response to a tap operation performed by a user on the first option on the first interface, a second interface, wherein the second interface is an editing interface of the first video, and the second interface further comprises a first control;
generating, by the electronic device in response to a first operation performed by the user on the first control on the second interface, a first finished video, wherein the first finished video is a video obtained by the electronic device by adding a first video effect to the first video;
displaying, by the electronic device, a third interface, wherein the third interface comprises a second option and the first option, and the second option displays a thumbnail of a frame of image in the first finished video;
displaying, by the electronic device in response to a tap operation performed by the user on the first option on the third interface, a fourth interface, wherein the fourth interface is an editing interface of the first video, and the fourth interface further comprises the first control; and
generating, by the electronic device in response to the first operation performed by the user on the first control on the fourth interface, a second finished video, wherein the second finished video is a video obtained by the electronic device by adding a second video effect to the first video, wherein the first video effect is different from the second video effect.

* * * * *